United States Patent
Song

(10) Patent No.: US 10,445,851 B2
(45) Date of Patent: Oct. 15, 2019

(54) IMAGE PROCESSING APPARATUS AND METHOD

(71) Applicant: SAMSUNG ELECTRONICS CO., LTD., Suwon-si, Gyeonggi-do (KR)

(72) Inventor: Yong-Bae Song, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 198 days.

(21) Appl. No.: 15/295,592

(22) Filed: Oct. 17, 2016

(65) Prior Publication Data
US 2017/0124678 A1    May 4, 2017

(30) Foreign Application Priority Data
Oct. 28, 2015  (KR) .................. 10-2015-0150269

(51) Int. Cl.
| H04N 5/228 | (2006.01) |
| H04N 5/262 | (2006.01) |
| G06T 1/20 | (2006.01) |
| G06T 1/60 | (2006.01) |
| G06F 13/28 | (2006.01) |

(52) U.S. Cl.
CPC .............. *G06T 1/20* (2013.01); *G06F 13/28* (2013.01); *G06T 1/60* (2013.01)

(58) Field of Classification Search
CPC ........... G06T 5/006; G06T 2207/20021; G06T 3/0018; H04N 3/23; H04N 5/23296; H04N 5/208; H04N 5/3572
See application file for complete search history.

(56) References Cited

U.S. PATENT DOCUMENTS

| 6,801,252 | B1 | 10/2004 | Kawada et al. | |
| 7,170,553 | B2 | 1/2007 | Matsuki et al. | |
| 8,477,383 | B2 | 7/2013 | Ito | |
| 8,681,246 | B2 | 3/2014 | Bocking et al. | |
| 2004/0196380 | A1* | 10/2004 | Shimazu | H04N 1/32112 348/222.1 |

(Continued)

FOREIGN PATENT DOCUMENTS

| JP | 2003-198836 | 7/2003 |
| JP | 2003-283815 | 10/2003 |

(Continued)

OTHER PUBLICATIONS

US 7,952,619 B2, 05/2011, Matsumura (withdrawn)

*Primary Examiner* — Sinh Tran
*Assistant Examiner* — Selam T Gebriel
(74) *Attorney, Agent, or Firm* — F. Chau & Associates, LLC

(57) ABSTRACT

An image processing apparatus is provided. The image processing apparatus includes a memory, a first image processor configured to perform a first image processing operation on image data to generate first data, and a second image processor configured to perform a second image processing operation on the first data to generate second data. In a first operation mode, the first data is directly transferred from the first image processor to the second image processor. When the first operation mode is changed to a second operation mode, the first data is transferred from the first image processor to the second image processor via the memory.

19 Claims, 30 Drawing Sheets

(56) References Cited

U.S. PATENT DOCUMENTS

| | | | |
|---|---|---|---|
| 2012/0154634 A1* | 6/2012 | Sugimura | H04N 5/772 348/231.99 |
| 2013/0021447 A1* | 1/2013 | Brisedoux | H04N 5/2258 348/47 |
| 2015/0163370 A1* | 6/2015 | Suzuki | H04N 1/2129 348/231.99 |
| 2016/0021301 A1 | 1/2016 | Song | |

FOREIGN PATENT DOCUMENTS

| JP | 2008-035307 | 2/2008 |
|---|---|---|
| KR | 1020080072217 | 8/2008 |

\* cited by examiner

FIG. 4B

IP1 | 1 | 2 | 3 | 4 | 5 | 6 | 7 | 8 | 9 | 10 | 11 | 12 | 14 | 15 | 16 |
IP2 | 1 | 2 | 3 | 4 | 5 | 6 | 7 | 8 | 9 | 10 | 11 | 12 | 14 | 15 | 16 |
MD1(Direct)

FIG. 5B

| IP1 | 1 | 2 | 3 | 4 | 5 | 6 | 7 | 8 | 9 | 10 | 11 | 12 | 14 | 15 | 16 |
| IP2 | | 1 | 2 | 3 | 4 | 5 | 6 | 7 | 8 | 9 | 10 | 11 | 12 | 14 | 15 |

MD2(DMA)

```
If (vblank && set_direct_mode) {
    if ( write_ptr == read_ptr) mode = Direct;
    else mode = DMA;
}
```

```
If (vblank && set_direct_mode) {
    if ( fifo_empty && Size_end) mode = Direct;
    else mode = DMA;
}
```

IMAGE PROCESSING APPARATUS AND METHOD

CROSS-REFERENCE TO RELATED APPLICATION

This application claims priority under 35 U.S.C. § 119 to Korean Patent Application No. 10-2015-0150269, filed on Oct. 28, 2015, in the Korean Intellectual Property Office, the disclosure of which is incorporated by reference in its entirety herein.

BACKGROUND

1. Technical Field

The inventive concept relates to an image processing apparatus, and more particularly, to an image processing apparatus which dynamically determines a data input/output mode according to an operation mode and an image processing method thereof.

2. Discussion of Related Art

An image sensor is a sensor that detects and conveys information that constitutes an image. It does so by converting the variable attenuation of waves into a signal as they pass through or reflect off objects. The waves can be light or other electromagnetic radiation. Image sensors are used in electronic image devices of both analog and digital types. An image sensor converts an optical image into an electrical signal, and an image processing apparatus processes image data obtained from the image sensor.

An image sensor and an image processing apparatus are applied to portable electronic devices, such as smartphones and digital cameras. However, since these devices are portable, they have a limited about a power with which to operate their image sensors.

SUMMARY

According to an exemplary embodiment of the inventive concept, there is provided an image processing apparatus that includes a memory, a first image processor configured to perform a first image processing operation on image data to generate first data, and a second image processor configured to perform a second image processing operation on the first data to generate second data. The image processing apparatus directly transfers the first data from the first image processor to the second image processor, when an operation mode is set to a first operation mode. The image processing apparatus transfers the first data from the first image processor to the second image processor via the memory, when the operation mode is set to a second operation mode.

According to an exemplary embodiment of the inventive concept, there is provided an application processor that includes a first image processor configured to perform a first image processing operation on image data to generate first data, and a second image processor configured to perform a second image processing operation on the first data to generate second data. The application processor directly transfers the first data from the first image processor to the second image processor, when an operation mode is set to a first operation mode. The application processor transfers the first data from the first image processor to the second image processor via a memory, when the operation mode is set to a second operation mode.

According to an exemplary embodiment of the inventive concept, there is provided an image processing method, performed by an image processing apparatus, which includes performing, by a first image processor, a first image processing operation on image data to generate first data, outputting, by the first image processor, the first data to one of a second image processor and a memory according to an input/output (I/O) mode of the first data, receiving, by the second image processor, the first data from one of the first image processor and the memory according to the I/O mode of the first data, and performing, by the second image processor, a second image processing operation on the first data to generate second data.

According to an exemplary embodiment of the inventive concept, an image processing apparatus includes a memory controller, a first image processor configured to perform a first image processing operation on image data to generate first data, and a second image processor configured to perform a second image processing operation on the first data to generate second data. The image processing apparatus directly transfers the first data from the first image processor to the second image processor, when an operation mode is set to a first operation mode. The image processing apparatus transfers the first data from the first image processor to the second image processor via the memory controller, when the operation mode is set to a second operation mode.

BRIEF DESCRIPTION OF THE DRAWINGS

Embodiments of the inventive concept will be more clearly understood from the following detailed description when taken in conjunction with the accompanying drawings in which:

FIG. 4B is a timing diagram showing operations of the first and second image processing units in a first input/output mode according to an exemplary embodiment of the inventive concept;

FIG. 5B is a timing diagram showing operations of the first and second image processing units in a second input/output mode according to an exemplary embodiment;

FIG. 15 illustrates an example of a mode changing control logic in an image processing apparatus according to an exemplary embodiment of the inventive concept;

FIG. 19 illustrates an example of a mode changing control logic in an image processing apparatus according to an exemplary embodiment of the inventive concept;

DETAILED DESCRIPTION OF THE EMBODIMENTS

Figure 1:
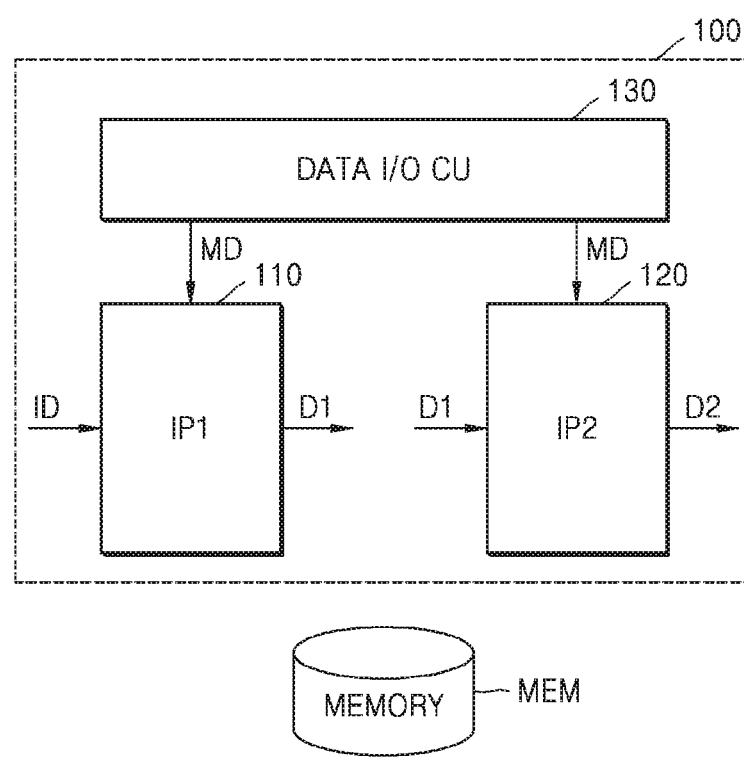
FIG. 1 is a block diagram illustrating an image processing apparatus according to an exemplary embodiment of the inventive concept.

Hereinafter, exemplary embodiments of the inventive concept will be described in detail with reference to the accompanying drawings. Embodiments of the inventive concept are provided so that this disclosure will be thorough and complete, and will fully convey the concept of the inventive concept to one of ordinary skill in the art. However, it should be understood that the inventive concept covers all modifications, equivalents, and replacements within the technical scope of the inventive concept. Like reference numerals refer to like elements throughout. The terms of a singular form may include plural forms unless referred to the contrary.

FIG. 1 is a block diagram illustrating an image processing apparatus 10 according to an exemplary embodiment of the inventive concept.

Referring to FIG. 1, the image processing apparatus 10 includes an image signal processor 100 and a memory MEM. The image signal processor 100 may include a first image processing unit 110 (e.g., an image processor such as a graphics processor or graphics processing unit (GPU)), a second image processing unit 120 (e.g., an image processor), and a data input/output (I/O) control unit 130 (e.g., an I/O controller). The image processing apparatus 10 according to an embodiment is a digital camera or an electronic device equipped with a digital camera. For example, the image processing apparatus 10 may be a mobile phone, a smartphone, or a tablet personal computer (PC). In an embodiment, the image signal processor 100 is located within an application processor of an electronic device.

In an exemplary embodiment, the memory MEM includes a volatile memory. The volatile memory may be, for example, dynamic random access memory (DRAM), but is not limited thereto. In an embodiment, the memory MEM includes a nonvolatile memory device. The nonvolatile memory device may be, for example, NAND flash memory, NOR flash memory, magnetoresistive random access memory (MRAM), phase-change random access memory (PRAM), or resistive random access memory (ReRAM), but is not limited thereto. In an embodiment, the memory MEM is a hard disk drive or a magnetic memory device.

In an embodiment, the first and second image processing units 110 and 120 and the data I/O control unit 130 are each implemented as a system-on-a-chip (SoC). Here, the SoC may be implemented with a system which has various functions and is integrated into a single semiconductor chip, and a plurality of intellectual properties (IPs) are integrated into the SoC. Each of the IPs may be provided in the SoC and may perform a certain function. Here, each of the IPs may denote a circuit, logic (e.g., software), or a combination thereof, which may be integrated into the SoC. In the present embodiment, the first image processing unit 110 may be referred to as a first IP IP1, and the second image processing unit 120 may be referred to as a second IP IP2. Also, in an exemplary embodiment, the first and second image processing units 110 and 120, the data I/O control unit 130, and the memory MEM are implemented as an SoC.

The first image processing unit 110 receives image data ID and performs a first image processing operation on the received image data ID to generate first data D1. The first image processing unit 110 may be referred to as a preprocessing unit, a pre-IP, or a pre-chain. In an embodiment, the image data ID is received from an image sensor such as a CMOS image sensor. In an embodiment, the image data ID is received from another image processing unit or an IP included in the image signal processor 100.

The second image processing unit 120 receives the first data D1 and performs a second image processing operation on the received first data D1 to generate second data D2. The second image processing unit 120 may be referred to as a post-processing unit, a post-IP, or a post-chain. In an embodiment, the first data D1 is received from the first image processing unit 110. In an embodiment, the first data D1 is received from the memory MEM.

For example, the first and second image processing units 110 and 120 may respectively correspond to a plurality of logic blocks that perform a signal processing operation, such as color interpolation, color correction, auto white balance, gamma correction, color saturation correction, format correction, bad pixel correction, hue correction, auto expose, auto focus, phase defector auto focus (PDAF), rotation, scaling, and demosaicing, on image data. In an embodiment, demosaicing is a function performed on image data to reconstruct a full color image from incomplete color samples output from an image sensor overlaid with a color filter array. The first image processing unit 110 may be, for example, an IP that performs auto expose, auto focus, auto white balance, or rotation, but is not limited thereto. The second image processing unit 120 may be, for example, an IP that performs scaling or demosaicing, but is not limited thereto. The scaling operation may include reducing or enlarging the size of an image.

In an embodiment, the data I/O control unit 130 is configured to dynamically determine a data I/O mode as a first I/O mode MD1 or a second I/O mode MD2, based on an operation mode of the image processing apparatus 10. According to an embodiment, when the operation mode is changed, the data I/O control unit 130 changes the first I/O mode MD1 to the second I/O mode MD2 or changes the second I/O mode MD2 to the first I/O mode MD1.

Moreover, the data I/O control unit 130 may supply the determined I/O mode to the first and second image processing units 110 and 120 as a mode signal MD. Here, the operation mode of the image processing apparatus 10 may be a normal mode or a zoom mode. In an exemplary embodiment, during the zoom mode, an operation is performed by the image processing apparatus 10 on an image to zoom in on the image so that an enlarged view of the image can be presented to a user. In an exemplary embodiment, during the zoom mode, an operation is performed by the image processing apparatus 10 on an image to zoom out on the image so that a reduced view of the image can be presented to a user. However, the present embodiment is not limited thereto, and the operation mode of the image processing apparatus 10 may be variously modified according to embodiments. The data I/O control unit 130 may dynamically determine a data I/O mode as the first I/O mode MD1 or the second I/O mode MD2, based on various operation modes of the image processing apparatus 10.

The image processing apparatus 10 may determine the operation mode as the zoom mode, based on a user input which is received through a touch, a button, a mouse, or a remote controller. In an embodiment, the data I/O control unit 130 receives an operation mode signal, indicating the operation mode, from an external source. For example, when the operation mode signal indicates the normal mode, the operation mode signal may have a first logic level, and when the operation mode signal indicates the zoom mode, the operation mode signal may have a second logic level. In an embodiment, when a zoom start command is received, the data I/O control unit 130 determines the operation mode of the image processing apparatus 10 as the zoom mode, and when a zoom end command is received, the data I/O control unit 130 determines the operation mode of the image processing apparatus 10 as the normal mode.

In the present embodiment, the data I/O control unit 130 is located outside the first and second image processing units 110 and 120. However, embodiments of the inventive concept are not limited thereto. In other embodiments, the data I/O control unit 130 is located inside at least one of the first and second image processing units 110 and 120.

Figure 2A:
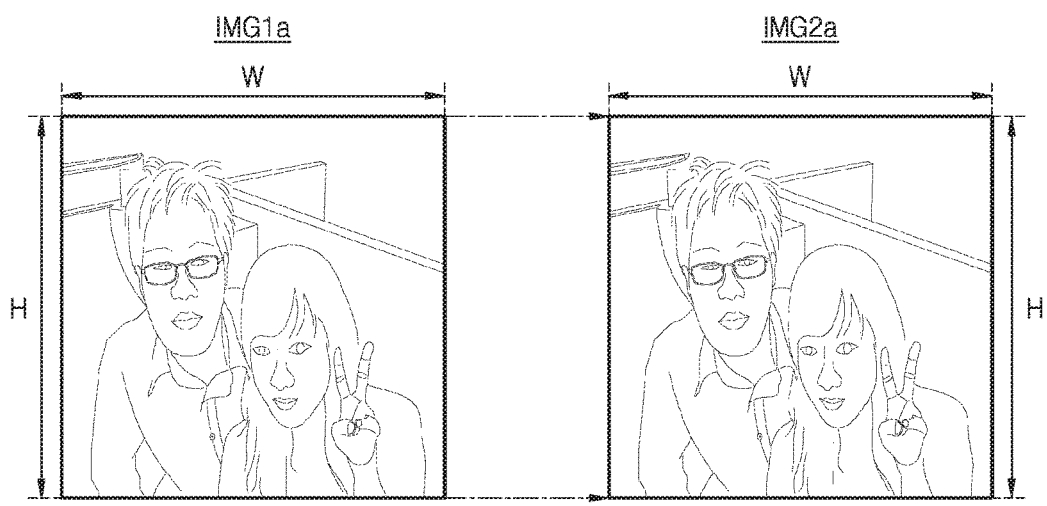
FIG. 2A illustrates images obtained through processing by first and second image processing units when an operation mode of an image processing apparatus is a normal mode.

FIG. 2A illustrates images obtained through processing by the first and second image processing units 110 and 120 when the operation mode of the image processing apparatus 10 is the normal mode.

Referring to FIGS. 1 and 2A, unless a user input for indicating changing of the operation mode is received, the image processing apparatus 10 operates in the normal mode, and thus, the normal mode may be referred to as a default mode. Here, the normal mode may be an operation mode where image processing is performed for a whole image obtained from an image sensor to output an image processing result corresponding to the whole image, and may be referred to as a 1:1 mode.

The first image processing unit 110 may receive image data ID corresponding to a first image IMG1$a$ to output first data D1 corresponding to the first image IMG1$a$. Here, the first image IMG1$a$ has a first width W and a first height H in size.

The second image processing unit 120 may receive the first data D1 corresponding to the first image IMG1$a$ to output second data D2 corresponding to the second image IMG2$a$. Here, the second image IMG2$a$ has the first width W and the first height H in size. When the image processing apparatus 10 operates in the normal mode, sizes of images input/output to/from the first and second image processing units 110 and 120 are 1:1.

Figure 2B:
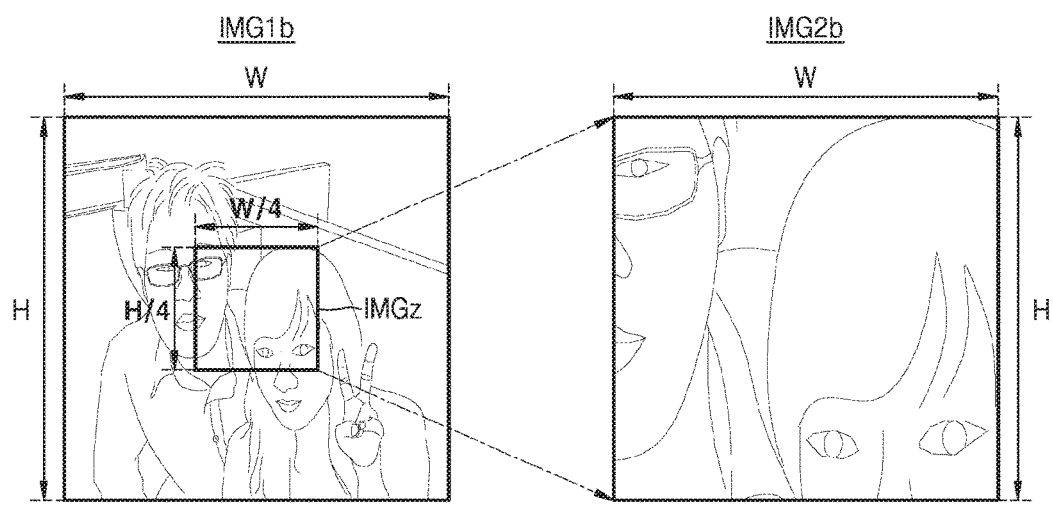
FIG. 2B illustrates images obtained through processing by the first and second image processing units when the operation mode of the image processing apparatus is a zoom mode.

FIG. 2B illustrates images IMG1$b$ and IMG2$b$ obtained through processing by the first and second image processing units 110 and 120 when the operation mode of the image processing apparatus 10 is the zoom mode.

Referring to FIGS. 1 and 2B, when a user input for indicating a zoom operation is received, the image processing apparatus 10 operates in the zoom mode. Here, the zoom mode may be an operation mode where a portion of a whole image obtained from an image sensor is enlarged to output an image processing result corresponding to a partial image. For example, enlarging the image may be referred to as a zoom-in. After the image is enlarged, the zoom mode may be used to zoom-out so that the previously enlarged image is reduced in size, but not necessarily to the original size of the whole image. However, the zoomed-out image in this example would still be considered enlarged with respect to the original image. For example, the image processing apparatus 10 may receive a user input for indicating a four times zoom operation. Hereinafter, a case where the image processing apparatus 10 performs the four times zoom operation will be described.

The first image processing unit 110 may perform, for example, a crop operation, and in detail, the first image processing unit 110 may receive image data ID corresponding to the first image IMG1$b$ to output first data D1 corresponding to a zoom zone IMGz. Here, the first image IMG1$b$ has a first width W and a first height H in size, and the zoom zone IMGz has a second width W/4 and a second height H/4 in size.

The second image processing unit 120 may perform, for example, an enlargement operation. For example, the second image processing unit 120 may receive the first image data ID1 corresponding to the zoom zone IMGz to output second data D2 corresponding to the second image IMG2$b$. Here, the zoom zone IMGz has the second width W/4 and the second height H/4 in size, and the second image IMG2$b$ has the first width W and the first height H in size. When the image processing apparatus 10 operates in the zoom mode, sizes of images input/output to/from the first and second image processing units 110 and 120 may differ.

Figure 3:
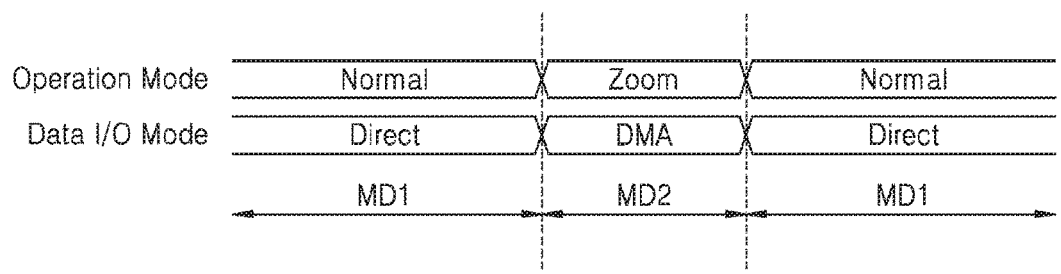
FIG. 3 illustrates an operation mode-based data input/output mode of an image processing apparatus according to an exemplary embodiment of the inventive concept.

FIG. 3 illustrates an operation mode-based data I/O mode of the image processing apparatus 10 according to an exemplary embodiment of the inventive concept.

Referring to FIG. 3, the data I/O control unit 130 determines a data I/O mode as a first I/O mode MD1 in a first operation mode, and in a second operation mode, the data I/O control unit 130 determines the data I/O mode as a second I/O mode MD2. In an embodiment, the first I/O mode MD1 is a direct mode, and the second I/O mode MD2 is a direct memory access (DMA) mode. In the present embodiment, the direct mode is a default mode, and the DMA mode is a mode which is executed in only a zoom operation. Hereinafter, a case where the first I/O mode MD1 is the direct mode and the second I/O mode MD2 is the DMA mode will be described. However, embodiments of the inventive concept are not limited thereto.

Figure 4A:
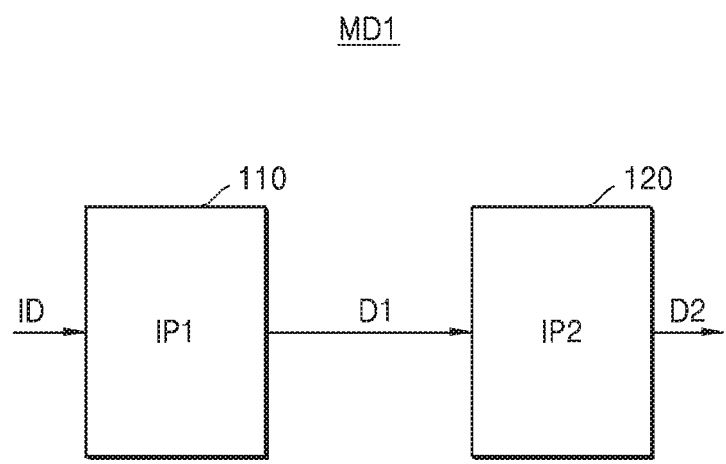
FIG. 4A is a block diagram illustrating a first input/output mode according to an exemplary embodiment of the inventive concept.

FIG. 4A is a block diagram illustrating the first I/O mode MD1 according to an exemplary embodiment. FIG. 4B is a timing diagram showing operations of the first and second image processing units 110 and 120 in the first I/O mode MD1 according to an exemplary embodiment. Hereinafter, the first I/O mode MD1 according to an exemplary embodiment will be described in detail with reference to FIGS. 1, 4A and 4B.

Referring to FIGS. 4A and 4B, in the first I/O mode MD1, first data D1 generated by the first image processing unit 110 is directly transferred to the second processing unit 120. In other words, in the first I/O mode MD1, the first processing unit 110 outputs the first data D1 to the second processing unit 120, and the second processing unit 120 receives the first data D1 from the first processing unit 110. In an embodiment, a signal line directly connects the first processing unit 110 to the second processing unit 120 and the first data D1 is sent along the signal line in the first I/O mode MD1.

During the first I/O mode MD1, the first data D1 is directly transferred from the first image processing unit 110 to the second image processing unit 120, and thus, latency hardly occurs in operations of the first and second image processing units 110 and 120. In an exemplary embodiment, during the first I/O mode MD1, an operation of accessing the memory MEM is not performed, thereby reducing power consumption. FIG. 4B illustrates when the latency is substantially 0, and thus the frames processed by the second image processing unit 120 are not delayed with respect to the frames processed by the first image processing unit 110.

Figure 5A:
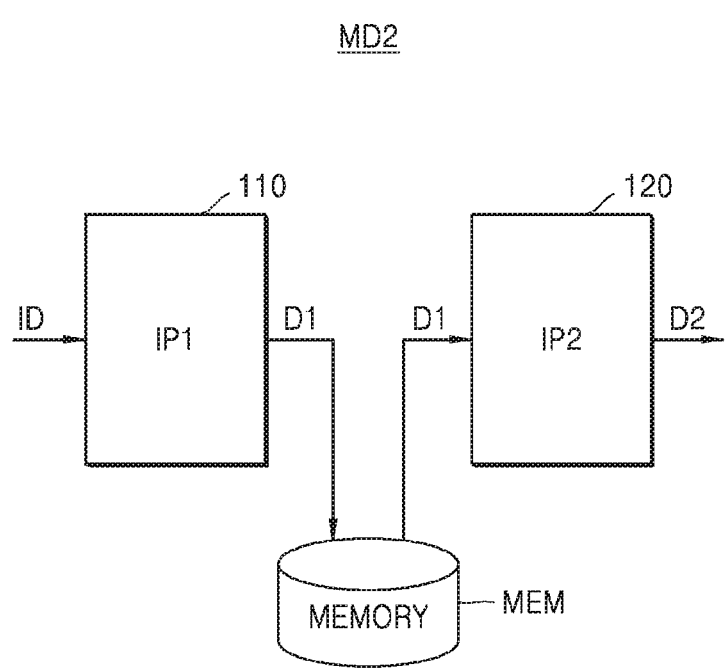
FIG. 5A is a block diagram illustrating a second input/output mode according to an exemplary embodiment of the inventive concept.

FIG. 5A is a block diagram illustrating the second I/O mode MD2 according to an exemplary embodiment. FIG. 5B is a timing diagram showing operations of the first and second image processing units 110 and 120 in the second I/O mode MD2 according to an exemplary embodiment. Hereinafter, the second I/O mode MD2 according to an exemplary embodiment will be described in detail with reference to FIGS. 1, 5A and 5B.

Referring to FIGS. 5A and 5B, in the second I/O mode MD2, first data D1 generated by the first image processing unit 110 is transferred to the second processing unit 120 via the memory MEM. In other words, in the first I/O mode MD1, the first processing unit 110 outputs the first data D1 to the memory MEM, and the second processing unit 120 receives the first data D1 from the memory MEM.

During the second I/O mode MD2, the first data D1 is transferred from the first image processing unit 110 to the second image processing unit 120 via the memory MEM, and for this reason, latency occurs in operations of the first and second image processing units 110 and 120. For example, while the first image processing unit 110 is performing a first image processing operation on a second frame, the second image processing unit 120 performs a second image processing operation on a first frame. FIG. 5B shows an example where the latency is the amount of time it takes for an image processing unit to operate on a single frame of received image data. Thus, FIG. 5B illustrates the frames processed by the second image processing unit 120 being delayed by a single frame period with respect to the frames processed by the first image processing unit 110.

Figure 6:
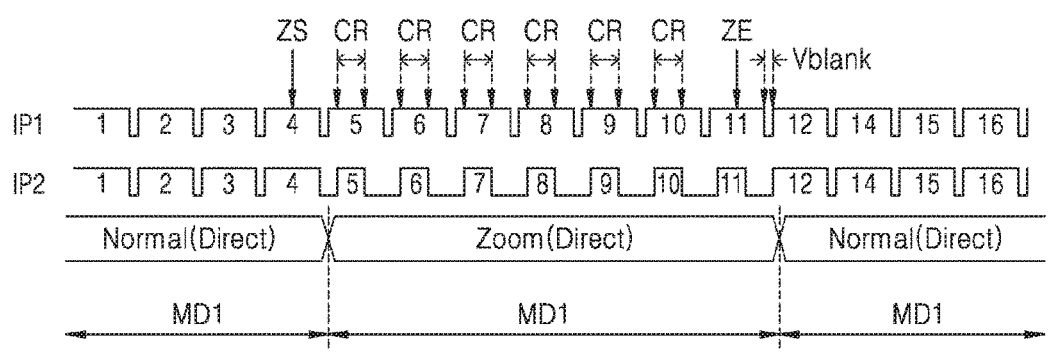
FIG. 6 is a timing diagram showing an example of operations of the first and second image processing units in a case of transmitting data in the first input/output mode when an operation mode of the image processing apparatus is the zoom mode.

FIG. 6 is a timing diagram showing an example of operations of the first and second image processing units 110 and 120 in a case of transmitting data in the first I/O mode MD1 when an operation mode of the image processing apparatus 10 is the zoom mode.

Referring to FIGS. 1 and 6, the image processing apparatus 10 receives a zoom start command ZS while the first image processing unit 110 is performing a first image processing operation on a fourth frame. Therefore, the operation mode of the image processing apparatus 10 changes from the normal mode to the zoom mode. In the zoom mode, when the first I/O mode MD1 (i.e., the direct mode) is used, the first image processing unit 110 outputs first data D1 to the second image processing unit 120 during a crop period CR corresponding to a zoom zone (for example, IMG1b of FIG. 2B), and the second image processing unit 120 receives the first data D1 during the crop period CR to generate second data D2 corresponding to a second image (for example, IMG2b of FIG. 2B).

The time during which the second image processing unit 120 is capable of performing the second image processing operation is limited to the crop period CR. Therefore, the second image processing unit 120 is in an idle state for a large portion of a total processable time and performs the second image processing operation corresponding to one frame during the crop period CR of the total processable time. In an exemplary embodiment, the second image processing unit 120 performs the second image processing operation for a limited time to improve the performance of the second image processing unit 120.

For example, a clock frequency of the second image processing unit 120 may be increased or a capacity of an internal buffer of the second image processing unit 120 may be increased. However these increases may increase the area and power consumption of the image processing apparatus 10. The image processing apparatus 10 may operate in the normal mode for most of the time and may operate in the zoom mode for a certain time. Therefore, a case where the hardware performance of the second image processing unit 120 is largely improved for supporting the second image processing operation of the second image processing unit 120 in the zoom mode is degraded in efficiency.

However, as described above with reference to FIGS. 1 to 5B, the image processing apparatus 10 according to an embodiment of the inventive concept determines a data I/O mode as the first I/O mode MD1 (i.e., the direct mode) in the normal mode, and in the zoom mode, the image processing apparatus 10 determines the data I/O mode as the second I/O mode MD2 (i.e., the DMA mode). Therefore, in the zoom mode, the first image processing unit 110 transfers the first data D1 to the second image processing unit 120 via the memory MEM. Therefore, it is not necessary to improve the hardware performance of the second image processing unit 120 for supporting the second image processing operation of the second image processing unit 120 in the zoom mode, and the image processing apparatus 10 may efficiently operate without any increase in area and consumption power of the image processing apparatus 10.

Figure 7:
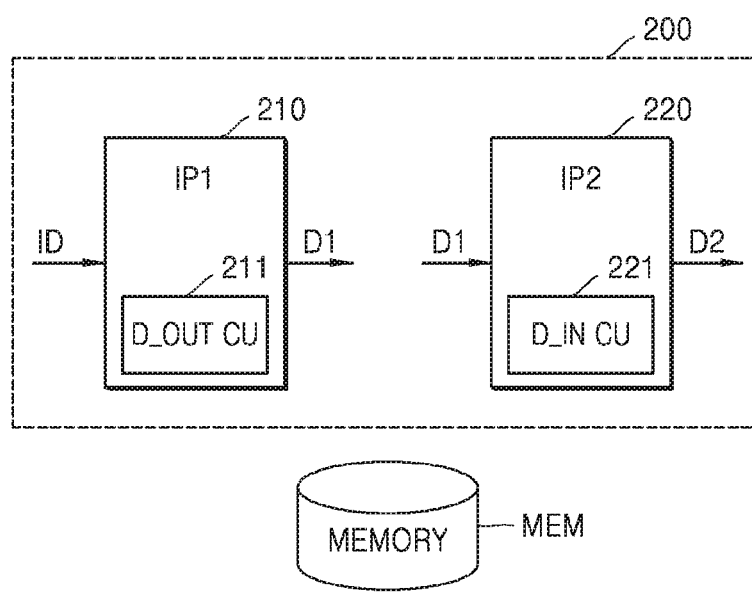
FIG. 7 is a block diagram illustrating an image processing apparatus according to an exemplary embodiment of the inventive concept.

FIG. 7 is a block diagram illustrating an image processing apparatus 20 according to an exemplary embodiment of the inventive concept.

Referring to FIG. 7, the image processing apparatus 20 includes an image signal processor 200 and a memory MEM. The image signal processor 200 includes a first image processing unit 210 and a second image processing unit 220. In the present embodiment, the first image processing unit 210 includes a data output control unit (D OUT CU) 211 (e.g., a first data output controller), and the second image processing unit 220 includes a data input control unit (D IN CU) 221 (e.g., a second data output controller). The memory MEM may be implemented as described above with reference to FIG. 1. Hereinafter, a difference between the present embodiment and the embodiment of FIG. 1 will be primarily described to avoid repetition.

The first image processing unit 210 receives image data ID and performs a first image processing operation on the received image data ID to generate first data D1. The second image processing unit 220 receives the first data D1 and performs a second image processing operation on the received first data D1 to generate second data D2.

The data output control unit 211 controls an output of the first data D1 to supply the first data D1 to the second image processing unit 220 in a first output mode or a supply of the first data D1 to the memory MEM in the second output mode. Here, the first output mode may be a direct mode where the first image processing unit 210 outputs the first data D1 to the second image processing unit 220, and may correspond to the above-described first I/O mode. Also, the second output mode may be a DMA mode where the first image processing unit 210 outputs the first data D1 to the memory MEM, and may correspond to the above-described second I/O mode.

In an embodiment, the data output control unit 211 determines an output mode of the first data D1 as one of the first output mode and the second output mode, based on an operation mode of the image processing apparatus 20 and controls an output of the first data D1, based on the determined output mode. In an embodiment, the data output control unit 211 receives a first mode signal indicating the output mode of the first data D1 from an outside source and controls an output of the first data D1 according to the received first mode signal. For example, the data output control unit 211 may be a demultiplexer that receives the first data D1 at its data input, receives the first mode signal at its selection input, and has a first output connected to the second image processing unit 220 and a second output connected to the memory MEM.

The data input control unit 221 controls an input of the first data D1 to receive the first data D1 from the first image processing unit 210 in the first input mode and to receive the first data D1 from the memory MEM in the second input mode. Here, the first input mode may be a direct mode where the first data D1 is received from the first image processing unit 210, and may correspond to the above-described first I/O mode. Also, the second input mode may be a DMA mode where the first data D1 is received from the first memory MEM, and may correspond to the above-described second I/O mode.

In an embodiment, the data input control unit 221 determines the input mode of the first data D1 as one of the first input mode and the second input mode, based on the operation mode of the image processing apparatus 20 and controls an output of the first data D1, based on the determined input mode. In an embodiment, the data input control unit 221 receives a second mode signal indicating the input mode of the first data D1 from an outside source and controls an input of the first data D1 according to the received mode signal. For example, the data input control unit 221 may be a multiplexer having a first data input connected to the first image processing unit 210, a second data input connected to the memory MEM, and a selection input receiving the second mode signal.

Figure 8:
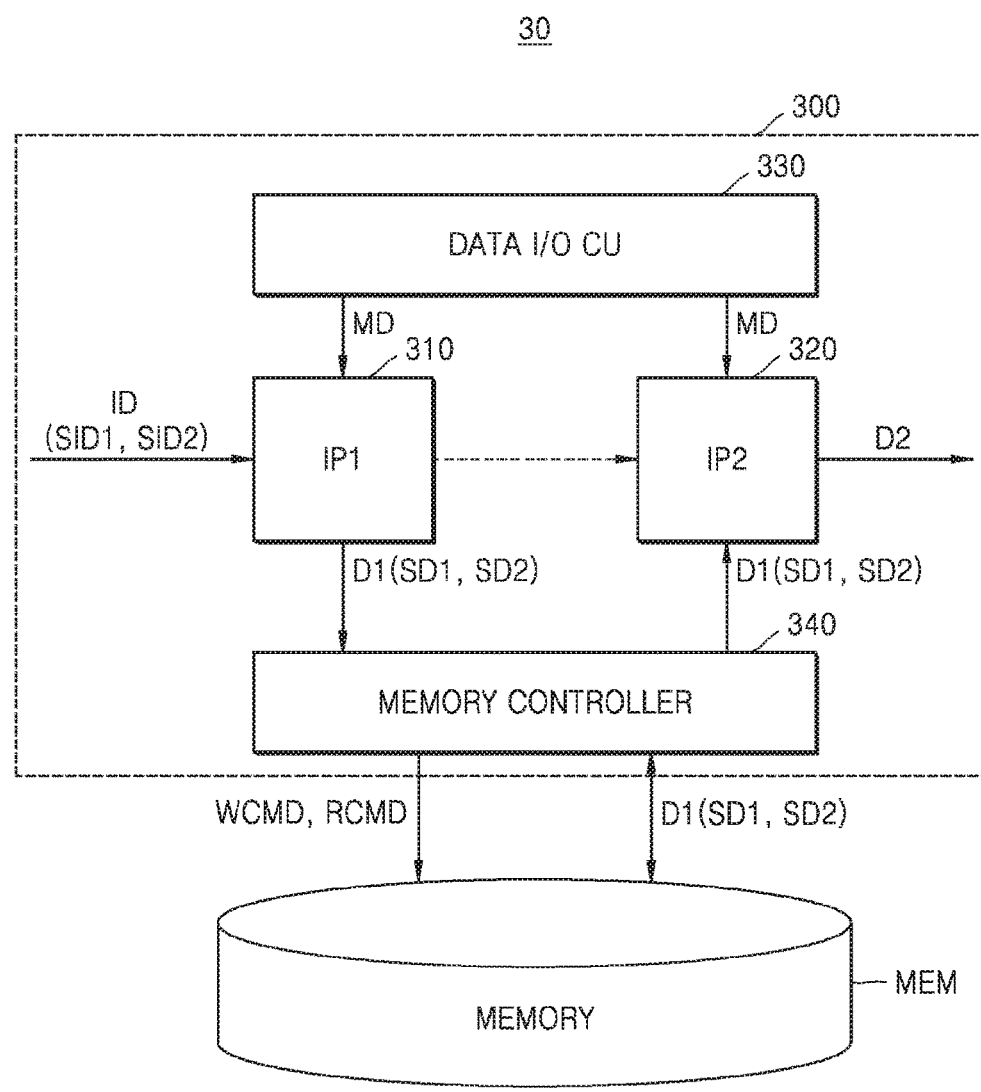
FIG. 8 is a block diagram illustrating an image processing apparatus according to an exemplary embodiment of the inventive concept.

FIG. 8 is a block diagram illustrating an image processing apparatus 30 according to an exemplary embodiment of the inventive concept.

Referring to FIG. 8, the image processing apparatus 30 includes an image signal processor 300 and a memory MEM. The image signal processor 300 includes a first image processing unit 310, a second image processing unit 320, a data I/O control unit 330 (e.g., a data I/O controller), and a memory controller 340. The memory MEM may be implemented as described above with reference to FIG. 1. Hereinafter, a difference between the embodiment of FIG. 8 and the embodiment of FIG. 1 will be primarily described to avoid repetition.

In an embodiment, the first and second image processing units 310 and 320, the data I/O control unit 330, and the memory controller 340 are each implemented as an SoC. In an embodiment, the first and second image processing units 310 and 320, the data I/O control unit 330, and the memory controller 340 are located within an application processor.

In an embodiment, the first and second image processing units 310 and 320 and the data I/O control unit 330 are each implemented as an SoC. In an embodiment, the first and second image processing units 310 and 320 and the data I/O control unit 330 are located within an application processor.

The first image processing unit 310 receives image data ID and performs a first image processing operation on the received image data ID to generate first data D1. In the present embodiment, the image data ID includes first sub-image data SID1 and second sub-image data SID2. In an embodiment, the first sub-image data SID1 includes first pixel group data of the image data ID, and the second sub-image data SID2 includes second pixel group data of the image data ID. For example, the first pixel group data may include image data for one or more rows of pixels of a display and the second pixel group data may include image data for one or more other rows of pixels of the display, where the rows are consecutive.

Figure 9:
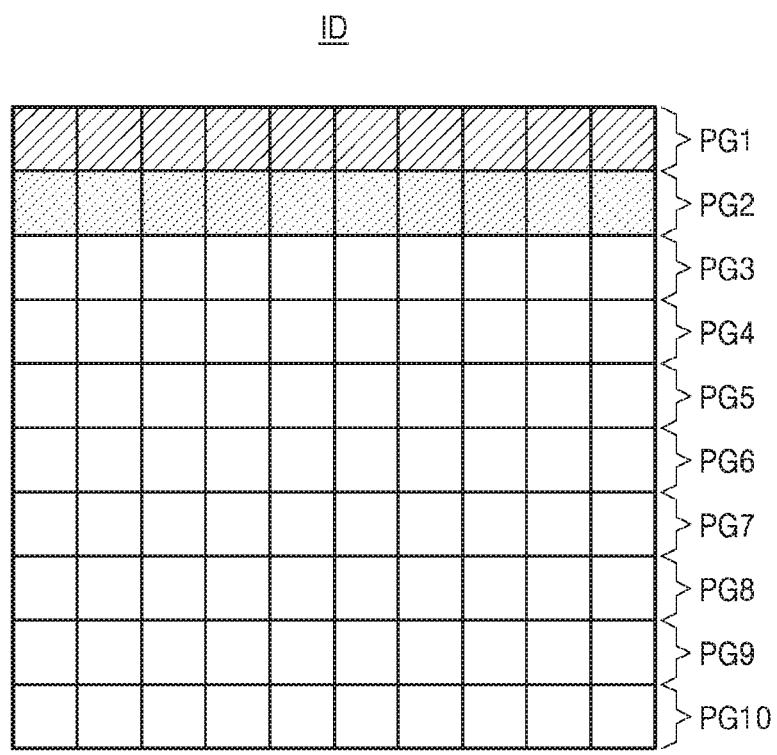
FIG. 9 illustrates image data input to the image processing apparatus of FIG. 8.

FIG. 9 illustrates image data ID input to the image processing apparatus 30 of FIG. 8.

Referring to FIG. 9, the image data ID includes a plurality of pixel group data PG1 to PG10. In FIG. 9, for convenience of description, the image data ID corresponding to one frame is illustrated as corresponding to 10×10 pixels. However, this is merely an example, and the present embodiment is not limited thereto. Hereinafter, the image data ID will be described in detail with reference to FIGS. 8 and 9.

In an embodiment, the first sub-image data SID1 includes the pixel group data PG1 arranged in a first row of the image data ID, and the second sub-image data SID2 includes the pixel group data PG2 arranged in a second row located under the first row. In an embodiment, the first sub-image data SID1 includes the pixel group data PG1 and PG2 respectively arranged in the first and second rows of the image data ID, and the second sub-image data SID2 includes the pixel group data PG3 and PG4 respectively arranged in third and fourth rows arranged under the first and second rows.

In some embodiments, the first sub-image data SID1 may include pixel group data PG1 to PG5 respectively arranged in first to fifth rows of the image data ID, and the second sub-image data SID2 may include pixel group data PG6 to PG10 respectively arranged in sixth to tenth rows arranged under the first to fifth rows. In the present embodiment, each of the first sub-image data SID1 and the second sub-image data SID2 is sub-image data constituting the image data ID, and a method of distinguishing the first sub-image data SID1 and the second sub-image data SID2 from the image data ID may be variously modified according to the embodiments.

Referring back to FIG. 8, the data I/O control unit 330 determines the data I/O mode as the first I/O mode in the first operation mode and determines the data I/O mode as the second I/O mode in the second operation mode. Also, the data I/O control unit 330 supplies the determined I/O mode to the first and second image processing units 310 and 320 as the mode signal MD. In an embodiment, the first operation mode may be the normal mode, and the second operation mode may be the zoom mode. In an embodiment, the first I/O mode is the direct mode, and the second I/O mode is the DMA mode. The details described above with reference to FIGS. 2A to 5B may be applied to the present embodiment, and thus a repetitive description is not provided.

The first image processing unit 310 performs the first image processing operation on the image data ID including the first sub-image data SID1 and the second sub-image data SID2 to generate the first data D1 including first sub-data SD1 and second sub-data SD2. In an embodiment, the first image processing unit 310 first performs the first image processing operation on the first sub-image data SID1 and then performs the first image processing operation on the second sub-image data SID2. The first image processing unit 310 outputs the first data D1 including the first sub-data SD1 and the second sub-data SD2 to the second image processing unit 320 in the first I/O mode, and in the second I/O mode, the first image processing unit 310 outputs the first data D1 including the first sub-data SD1 and the second sub-data SD2 to the memory MEM.

The second image processing unit 320 performs the second image processing operation on the first data D1 including the first sub-data SD1 and the second sub-data SD2 to generate the second data D2. In an embodiment, the second image processing unit 320 first performs the second image processing operation on the first sub-data SD1 and then performs the second image processing operation on the second sub-data SD2. The second image processing unit 320 receives the first data D1 including the first sub-data SD1 and the second sub-data SD2 from the first image processing unit 310 in the first I/O mode, and in the second I/O mode, the second image processing unit 320 receives the first data D1 including the first sub-data SD1 and the second sub-data SD2 from the memory MEM.

In an embodiment, the memory controller 340 is activated when an I/O mode of the first data D1 is the second I/O mode, and is deactivated when the I/O mode of the first data D1 is the first I/O mode. Hereinafter, an operation of the memory controller 340 when the I/O mode of the first data D1 is the second I/O mode will be described.

In an embodiment, the memory controller 340 controls the memory MEM to enable the second image processing unit 320 to read the first sub-data SD1 from the memory MEM before the second sub-data SD2 is written to the memory MEM after the first sub-data SD1 is written to the memory MEM. In an embodiment, the memory controller 340 controls the memory MEM through a memory bus. In an embodiment, the memory controller 340 supplies a write command WCMD to the memory bus to write the first data D1 to the memory MEM and supplies a read command RCMD to the memory bus to supply the first data D1 stored in the memory MEM to the second image processing unit 320.

An operation of the memory controller 340 when the image processing apparatus 30 is in the zoom mode and the I/O mode of the first data D1 is the second I/O mode will be described. First, when the first image processing unit 310 completes the first image processing operation on the first sub-image data SID1, the memory controller 340 supplies, to the memory bus, a write command WCMD for writing first-image-processed first sub-image data (i.e., the first sub-data SD1) to the memory MEM. Subsequently, when a response indicating that the first sub-data SD1 has been written is received from the memory MEM, the memory controller 340 supplies a read command RCMD to the memory bus to supply the first sub-data SD1 to the second image processing unit 320. Subsequently, when the first sub-data SD1 is received from the memory MEM, the memory controller 340 supplies the first sub-data SD1 to the second image processing unit 320. Therefore, the second image processing unit 320 may perform the second image processing operation on the first sub-data SD1.

Subsequently, when the first image processing unit 310 completes the first image processing operation on the second sub-image data SID2, the memory controller 340 supplies, to the memory bus, a write command WCMD for writing first-image-processed second sub-image data (i.e., the second sub-data SD2) to the memory MEM. Subsequently, when a response indicating that the second sub-data SD2 has been written is received from the memory MEM, the memory controller 340 supplies a read command RCMD to the memory bus to supply the second sub-data SD2 to the second image processing unit 320. Subsequently, when the second sub-data SD2 is received from the memory MEM, the memory controller 340 supplies the second sub-data SD2 to the second image processing unit 320. Therefore, the second image processing unit 320 performs the second image processing operation on the second sub-data SD2.

As described above, according to the present embodiment, the memory controller 340 supplies, to the memory bus, a read command RCMD for reading the first sub-data SD1 from the memory MEM before supplying a write command WCMD for writing the second sub-data SD2. Therefore, while the first image processing unit 310 is performing the first image processing operation on the second sub-image data SID2, the second image processing unit 320 performs the second image processing operation on the first sub-data SD1. Therefore, despite the first data D1 being transferred in the second I/O mode, latency between the first image processing unit 310 and the second image processing unit 320 may be reduced, and the first data D1 may be transferred to the second image processing unit 320 at a speed similar to a speed at which the first data D1 is transferred.

In an embodiment, the first and second image processing units 310 and 320, the data I/O control unit 330, and the memory controller 340 are integrated into a single chip. In an embodiment, the memory controller 340 is integrated into a single chip different from a chip into which the first and second image processing units 310 and 320 and the data I/O control unit 330 are integrated. In an embodiment, the memory controller 320 is located within the memory MEM.

Figure 10:
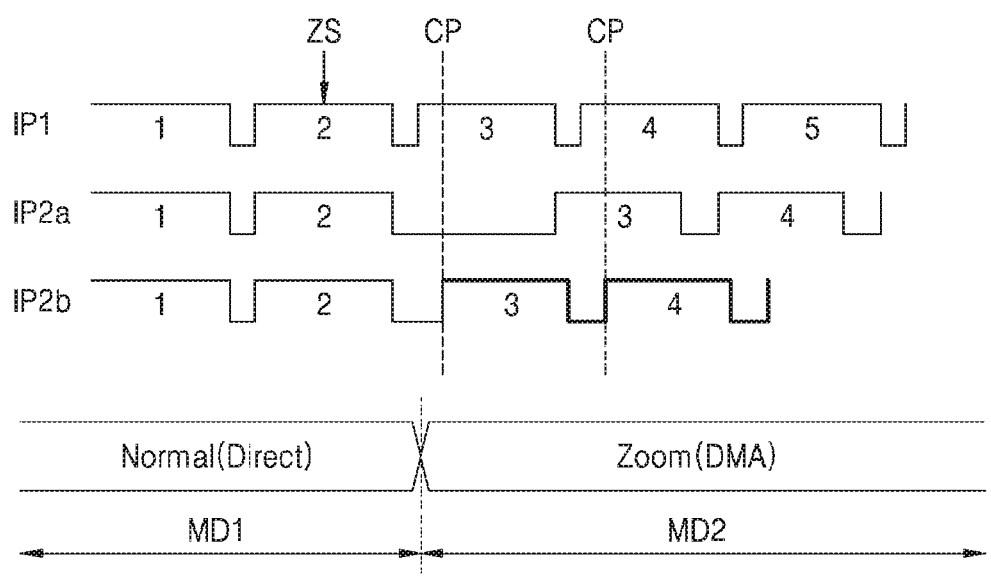
FIG. 10 is a timing diagram showing an example of operations of first and second image processing units in an image processing apparatus according to an exemplary embodiment of the inventive concept.

FIG. 10 is a timing diagram showing an example of operations of the first and second image processing units 310 and 320 in the image processing apparatus 30 according to an exemplary embodiment of the inventive concept.

Referring to FIG. 10, the image processing apparatus 30 receives a zoom start command ZS while the first image processing unit 310 is processing a second frame. Therefore, the operation mode of the image processing apparatus 30 is changed from the normal mode to the zoom mode. According to the present embodiment, in the zoom mode, the data I/O control unit 330 determines an I/O mode of the first data D1 as a second I/O mode, namely, the DMA mode. Therefore, the first image processing unit 310 outputs the first data D1 to the memory MEM, and the second image processing unit 320 receives the first data D1 from the memory MEM.

IP2a is a comparative example of the present embodiment, and when the image processing apparatus 30 does not include the memory controller 340, IP2a denotes an operation of the second image processing unit 320. In this case, the first image processing unit 310 completes a first image processing operation on the image data ID, and then, the second image processing unit 320 performs a second image processing operation on the first data D1. For example, while the first image processing unit 310 is performing the first image processing operation on a fourth frame, the second image processing unit 320 is performing the second image processing operation on a third frame. Therefore, a frame delay occurs between the first and second image processing units 310 and 320.

IP2b is the present embodiment, and when the image processing apparatus 30 includes the memory controller 340, IP2b denotes an operation of the second image processing unit 320. In this case, the memory controller 340 controls the memory MEM to enable the second image processing unit 320 to read the first sub-data SD1 from the memory MEM before the second sub-data SD2 is written to the memory MEM after first sub-data SD1 is written to the memory MEM. Therefore, latency hardly occurs between the first and second image processing units 310 and 320. As described above, according to the present embodiment, even when a second I/O mode MD2 (i.e., the DMA mode) is used in the zoom mode, latency hardly occurs between the first and second image processing units 310 and 320 similar to a first I/O mode MD1 (i.e., the direct mode).

Figure 11:
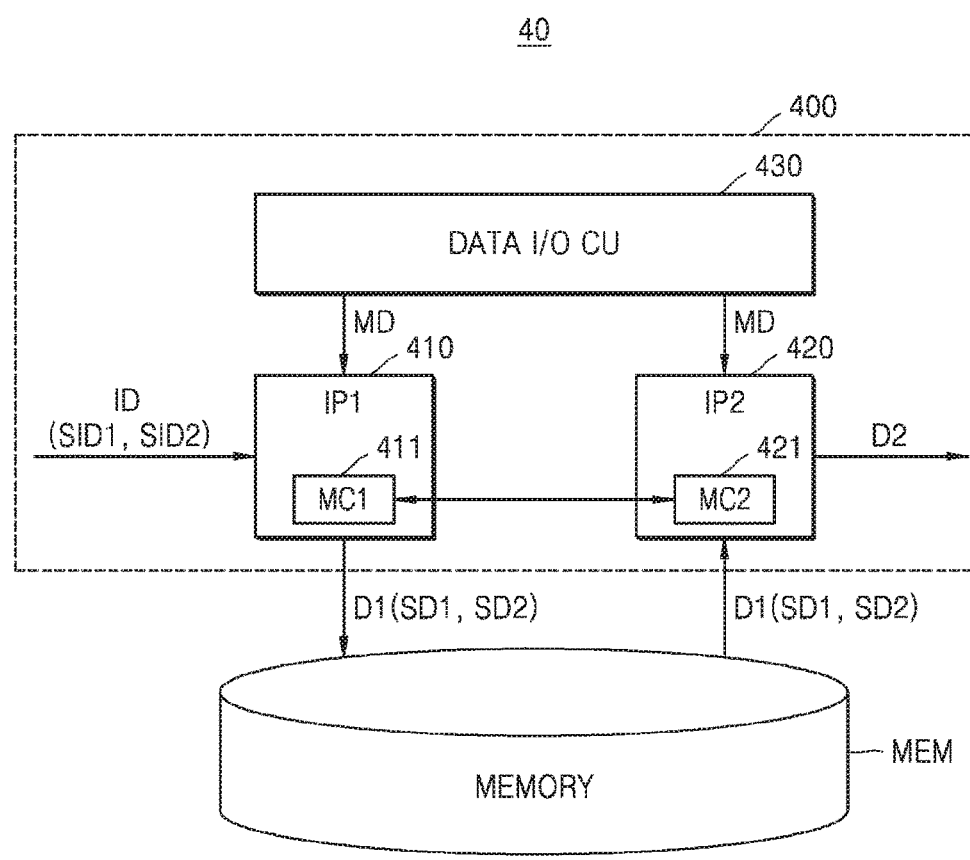
FIG. 11 is a block diagram illustrating an image processing apparatus according to an exemplary embodiment of the inventive concept.

FIG. 11 is a block diagram illustrating an image processing apparatus 40 according to an exemplary embodiment of the inventive concept.

Referring to FIG. 11, the image processing apparatus 40 includes an image signal processor 400 and a memory MEM. The image signal processor 400 includes a first image processing unit 410, a second image processing unit 420, and a data I/O control unit 430. The memory MEM may be implemented as described above with reference to FIG. 1. The image processing apparatus 40 according to the present embodiment may be implemented by modifying the image processing apparatus 30 of FIG. 8. Hereinafter, a difference between the embodiment of FIG. 11 and the embodiment of FIG. 8 will be primarily described to avoid repetition.

In the present embodiment, the first image processing unit 410 includes a first memory controller (MC1) 411, and the second image processing unit 420 includes a second memory controller (MC2) 421. In an embodiment, the first and second memory controllers 411 and 421 are activated in a second I/O mode (i.e., the DMA mode) of first data D1 and are deactivated in a first I/O mode (i.e., the direct mode) of the first data D1. Hereinafter, operations of the first and second memory controllers 411 and 421 when an I/O mode of the first data D1 is the second I/O mode will be described.

The first image processing unit 410 sequentially performs a first image processing operation on first sub-image data SID1 and second sub-image data SID2 to generate first sub-data SD1 and second sub-data SD2. When the first sub-data SD1 is generated, the first memory controller 411 supplies a write command and the first sub-data SD1 to the memory MEM to control a write operation applied to the first sub-data SD1. Subsequently, when the second sub-data SD2 is generated, the first memory controller 411 supplies the write command and the second sub-data SD2 to the memory MEM to control a write operation applied to the second sub-data SD2.

The second image processing unit 420 sequentially performs a second image processing operation on the first sub-data SD1 and the second sub-data SD2 to generate second data D2. When the first sub-data SD1 is written to the memory MEM, the second memory controller 421 supplies a read command to the memory MEM to read the first sub-data SD1. Subsequently, when the second sub-data SD2 is written to the memory MEM, the second memory controller 421 supplies the read command to the memory MEM to read the second sub-data SD2.

According to the present embodiment, each of the first and second memory controllers 411 and 421 control the memory MEM to enable the second image processing unit 420 to read the first sub-data SD1 from the memory MEM and perform the second image processing operation on the first sub-data SD1 before the second sub-data SD2 is written to the memory MEM after the first sub-data SD1 is written to the memory MEM. Therefore, according to the present embodiment, an operation of the second image processing unit 420 may be implemented similar to IP2b of FIG. 10.

Figure 12:
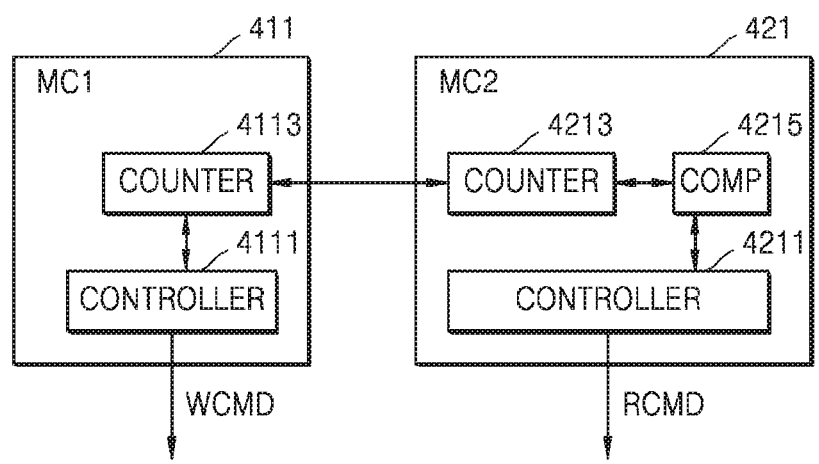
FIG. 12 is a block diagram illustrating first and second memory controllers of FIG. 11 in more detail.

FIG. 12 is a block diagram illustrating the first and second memory controllers 411 and 421 of FIG. 11 in more detail according to an exemplary embodiment of the inventive concept.

Referring to FIG. 12, the first memory controller 411 includes a first controller 4111 and a first counter 4113, and the second memory controller 421 includes a second controller 4211, a second counter 4213, and a comparator 4215. Hereinafter, operations of the first and second memory controllers 411 and 421 will be described with reference to FIGS. 11 and 12.

When the first sub-data SD1 is generated, the first controller 4111 supplies a write command WCMD to the memory MEM. Also, after the first controller 4111 supplies the write command WCMD to the memory MEM, the first controller 4111 increases a count value of the first counter 4113. The second counter 4213 is connected to the first counter 4113. In an embodiment, a count value of the second counter 4213 increases at the same time when the count value of the first counter 4113 increases. The comparator 4215 compares a predetermined value with the count value of the second counter 4213, and when the predetermined value matches the count value of the second counter 4213, the comparator 4215 supplies a predetermined output signal to the second controller 4211. The second controller 4211 may receive the output signal from the comparator 4215 to supply a read command RCMD to the memory MEM. In an embodiment, the predetermined value is the previous value of the second counter 4213 and whenever the comparator 4215 determines that the current value of the counter 4213 is one more than the previous value, the second controller 4211 supplies the read command RCMD to the memory MEM to retrieve the stored sub-data.

In the present embodiment, the first counter 4113 performs a function of a recording unit that records a time when the first sub-data SD1 is written to the memory MEM, and the second counter 4213 and the comparator each perform a function of a sensing unit that senses the time when the first sub-data SD1 is written to the memory MEM. However, the present embodiment is not limited thereto, and a configuration of each of the recording unit and the sensing unit may be variously modified according to embodiments.

In the present embodiment, the first and second memory controllers 411 and 421 are respectively included in the first and second image processing units 410 and 420, but the present embodiment is not limited thereto. In an exemplary embodiment, the first and second memory controllers 411 and 421 are located outside the first and second image processing units 410 and 420. In an exemplary embodiment, the first and second memory controllers 411 and 421 are implemented as a single controller that is located in the first image processing unit 410 or in the second image processing unit 420.

Figure 13:
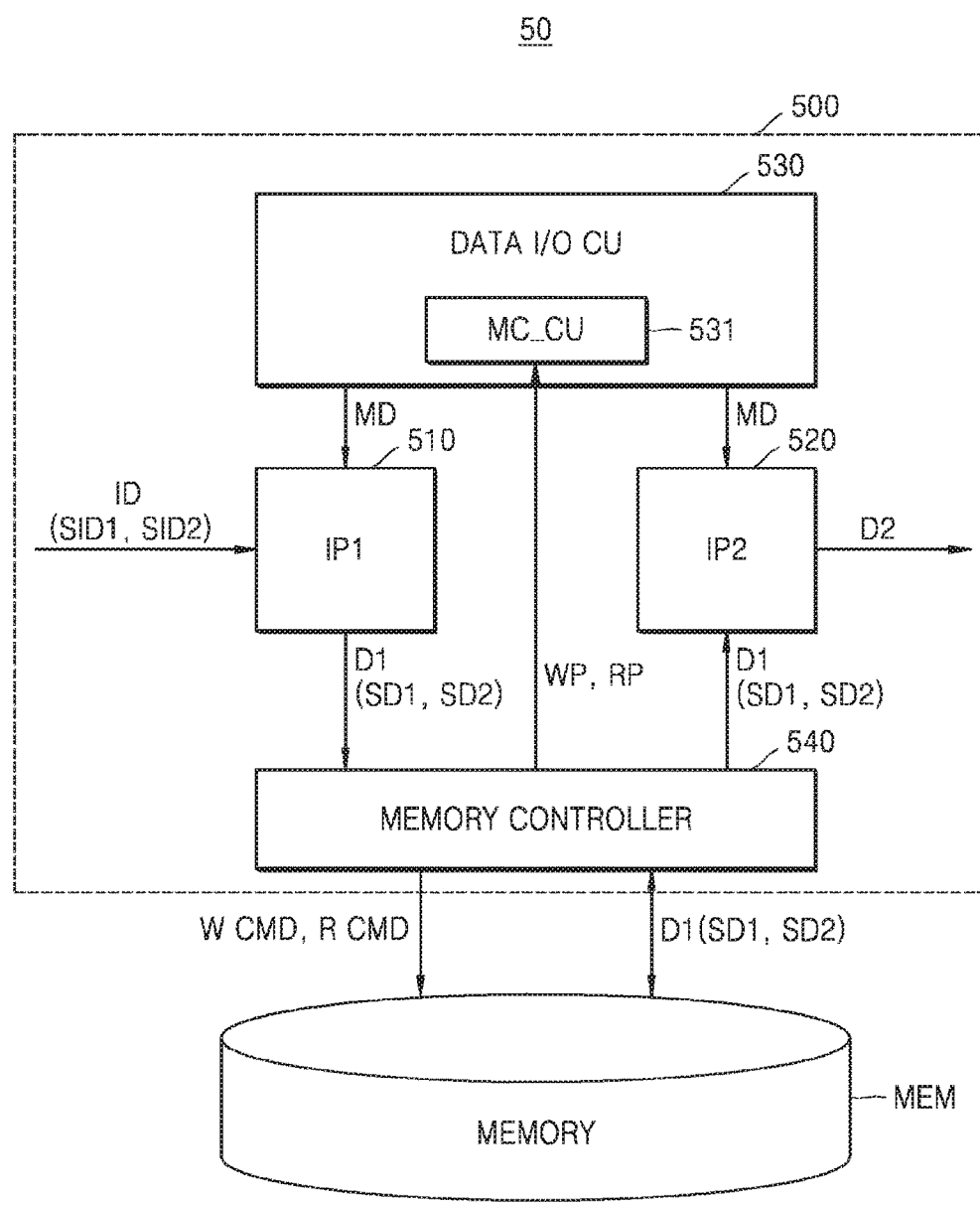
FIG. 13 is a block diagram illustrating an image processing apparatus according to an exemplary embodiment of the inventive concept.

FIG. 13 is a block diagram illustrating an image processing apparatus 50 according to an exemplary embodiment of the inventive concept.

Referring to FIG. 13, the image processing apparatus 50 includes an image signal processor 500 and a memory MEM. The image signal processor 500 includes a first image processing unit 510, a second image processing unit 520, a data I/O control unit 530, and a memory controller 540. The memory MEM may be implemented as described above with reference to FIG. 1. The image processing apparatus 50 according to the present embodiment may be implemented by modifying the image processing apparatus 30 of FIG. 8. Hereinafter, a difference between the embodiment of FIG. 13 and the embodiment of FIG. 8 will be primarily described to avoid repetition.

When a zoom end command is applied, the data I/O control unit 530 determines an operation mode of the image processing apparatus 50 as the normal mode and determines an I/O mode of first data D1 as a first I/O mode (for example, MD1 of FIG. 3). Also, the data I/O control unit 530 outputs the first I/O mode as a mode signal MD. However, in the zoom mode before the zoom end command is applied, the first data D1 is input to the second image processing unit 520 via the memory MEM according to a second I/O mode (for example, MD2 of FIG. 2), and for this reason, latency occurs between the first and second image processing units 510 and 520. Therefore, an operation of the second image processing unit may be slower than that of the first image processing unit 510. However, when the I/O mode of the first data D1 is immediately changed to the first I/O mode according to the mode signal MD, the drop of a frame which is not yet processed by the second image processing unit 520 occurs.

According to the present embodiment, the data I/O control unit 530 includes a mode changing controller (MC CU) 531 (e.g., a controller circuit). When the zoom end command is applied, the mode changing controller 531 checks a processing state of the second image processing unit 520 and changes the I/O mode of the first data D1, based on a result of the check. However, the present embodiment is not limited thereto. For example, the mode changing controller 531 may be located outside the data I/O control unit 530. In an embodiment, the mode changing controller 531 is located inside at least one of the first and second image processing units 510 and 520.

The mode changing controller 531 may receive a write pointer WP and a read pointer RP from the memory controller 540. Here, the write pointer WP indicates a location of the memory MEM at which a write operation has been completed by the first image processing unit 510. The write pointer WP may indicate an address of an area at which the write operation has completed in the memory MEM. Also, the read pointer RP may indicate a location of the memory MEM at which a read operation has been completed by the second image processing unit 520. The read pointer RP may indicate an address of an area at which the read operation has been completed in the memory MEM.

When the zoom end command is applied, the mode changing controller 531 compares the write pointer WP with the read pointer RP, and when the write pointer WP matches the read pointer RP, the mode changing controller 531 changes the I/O mode of the first data D1 from the second I/O mode to the first I/O mode. In the present embodiment, the mode changing controller 531 performs a comparison operation of comparing the write pointer WP with the read pointer RP and an I/O mode changing operation in a blank period (for example, Vblank of FIG. 6). For example, initially the write pointer WP and the read pointer RP are set to a same location within memory MEM, and then when the last part of the first data D1 (e.g., sub-data SD2) is written to the memory MEM, the write pointer WP advances to a next location. If the zoom end command is then applied, the mode changing controller 531 can wait until the read pointer RP has also advanced to the next location before setting the I/O mode to the first I/O mode.

Figure 14:
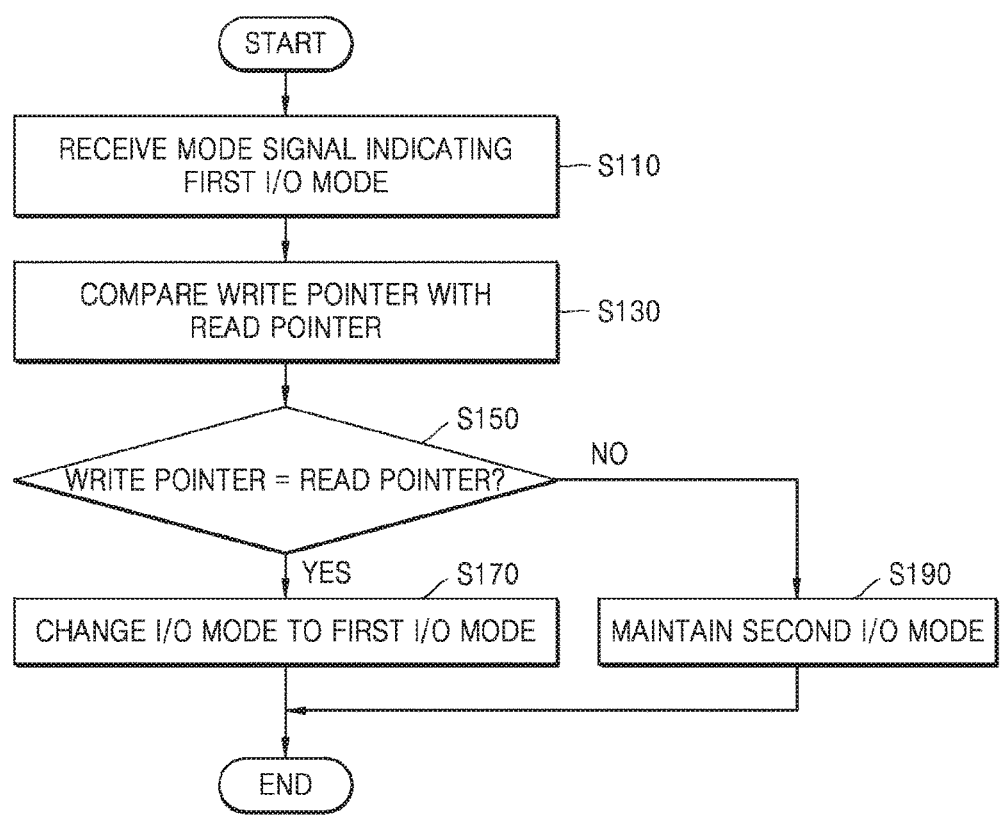
FIG. 14 is a flowchart illustrating an image processing method according to an exemplary embodiment of the inventive concept.

FIG. 14 is a flowchart illustrating an image processing method according to an exemplary embodiment of the inventive concept.

Referring to FIG. 14, the image processing method according to an embodiment may be a method which is time-serially performed by an image processing apparatus, and for example, may include operations which are time-serially performed by the image processing apparatus 50 of FIG. 13. In detail, the image processing method according to an embodiment may include operations which are time-serially performed by the mode changing controller 531 of FIG. 13. Hereinafter, an image processing method corresponding to an operation of the mode changing controller 531 will be described with reference to FIGS. 13 and 14.

In operation S110, the mode changing controller 531 receives a mode signal indicating a first I/O mode. Here, the first I/O mode may be the direct mode. For example, the data I/O control unit 530 generates a mode signal MD and supplies the generated mode signal MD to the mode changing controller 531. However, the present embodiment is not limited thereto, and the mode changing controller 531 may receive a zoom end command to perform operations which will be described below.

In operation S130, the mode changing controller 531 compares a write pointer WP with a read pointer RP. The mode changing controller 531 may compare the write pointer WP with the read pointer RP in a blank period. In operation S150, the mode changing controller 531 determines whether the write pointer WP matches the read pointer RP. When it is determined that the write pointer WP matches the read pointer RP, operation S170 is performed, and when it is determined that the write pointer WP does not match the read pointer RP, operation S190 is performed.

In operation S170, the mode changing controller 531 changes a data I/O mode to the first I/O mode. When it is determined that the write pointer WP matches the read pointer RP, the mode changing controller 531 determines that the second image processing unit 520 has read all of first data D1 of a corresponding frame which is written to the memory MEM by the first image processing unit 510. In other words, the mode changing controller 531 determines that the second image processing unit 520 has completed a read operation of reading the first data D1. Therefore, the mode changing controller 531 allows the first data D1 to be transferred between the first and second image processing units 510 and 520 according to the first I/O mode.

In operation S190, the mode changing controller 531 maintains a second I/O mode. When it is determined that the write pointer WP does not match the read pointer RP, the mode changing controller 531 determines that the second image processing unit 520 has not yet read all of the first data D1 of the corresponding frame which is written to the memory MEM by the first image processing unit 510. In other words, the mode changing controller 531 determines that the read operation of reading the first data D1 has not been completed by the second image processing unit 520. Therefore, the mode changing controller 531 allows the first data D1 to continue being transferred between the first and second image processing units 510 and 520 according to the second I/O mode, thereby preventing a frame drop.

FIG. 15 illustrates an example of a mode changing control logic CL1 in the image processing apparatus 50 according to an exemplary embodiment of the inventive concept.

The image processing apparatus 50 includes an arbitrary hardware block equipped with the mode changing control logic CL1 of FIG. 15. For example, the mode changing controller 531 of FIG. 13 may be the hardware block equipped with the mode changing control logic CL1. In a case where a current period is a vertical blank period and an I/O mode is set to the direct mode, when a write pointer matches a read pointer, the mode changing control logic CL1 according to the present embodiment determines the I/O mode as the direct mode, and when the write pointer does not match the read pointer, the mode changing control logic CL1 determines the I/O mode as the DMA mode.

Figure 16:
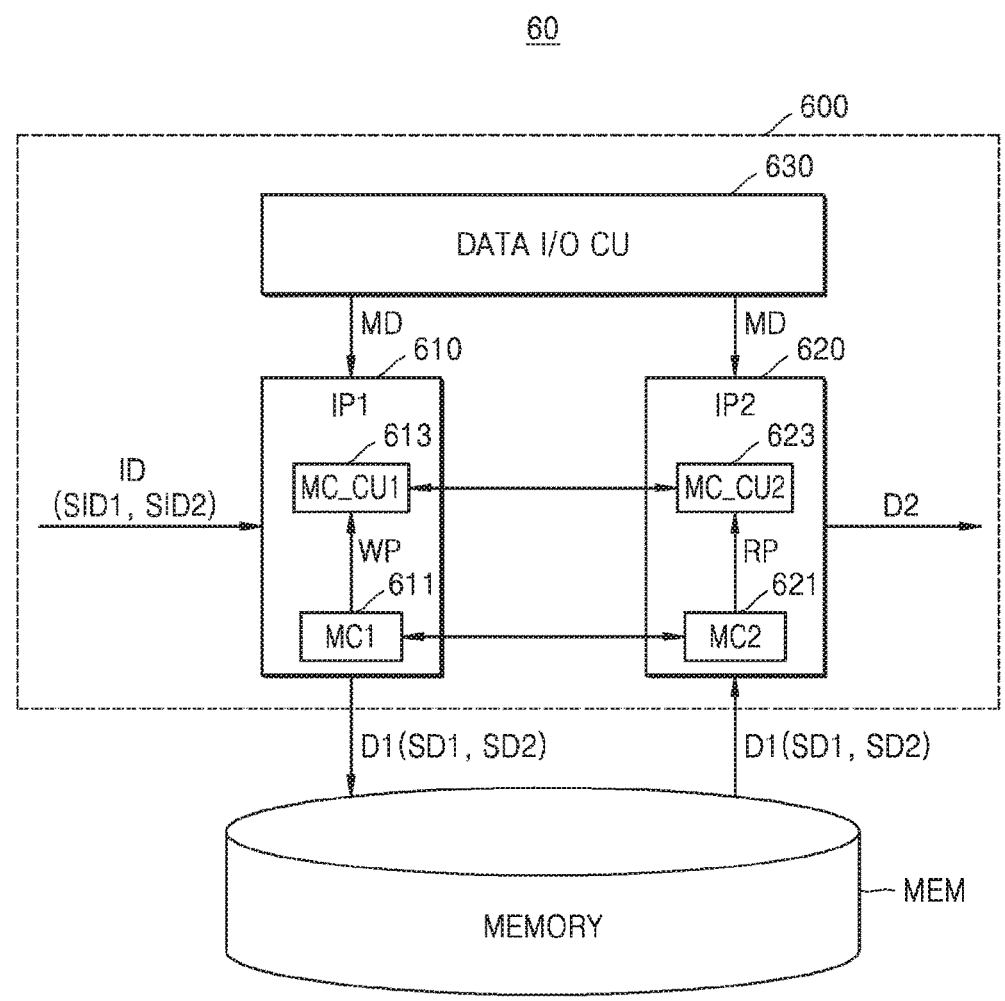
FIG. 16 is a block diagram illustrating an image processing apparatus according to an exemplary embodiment of the inventive concept.

FIG. 16 is a block diagram illustrating an image processing apparatus 60 according to an exemplary embodiment of the inventive concept.

Referring to FIG. 16, the image processing apparatus 60 includes an image signal processor 600 and a memory MEM. The image signal processor 600 includes a first image processing unit 610, a second image processing unit 620, and a data I/O control unit 630. The memory MEM may be implemented as described above with reference to FIG. 1. The image processing apparatus 60 may be implemented by modifying the image processing apparatus 40 of FIG. 11. Hereinafter, a difference between the embodiment of FIG. 16 and the embodiment of FIG. 11 will be primarily described to avoid repetition.

In the present embodiment, the first image processing unit 610 includes a first memory controller (MC1) 611 and a first mode changing controller (MC CU1) 613, and the second image processing unit 620 includes a second memory controller (MC2) 621 and a second mode changing controller (MC CU2) 623. The first and second memory controllers 611 and 621 may be respectively implemented in a manner that is substantially similar to the first and second memory controllers 411 and 421 of FIG. 11.

The first mode changing controller 613 receives a write pointer WP from the first memory controller 611. Also, the first mode changing controller 613 receives a read pointer RP from the second memory controller 621 or the second mode changing controller 623. When a zoom end command is applied, the first mode changing controller 613 compares the received write pointer WP with the received read pointer RP, and when the write pointer WP matches the read pointer RP, the first mode changing controller 613 changes an I/O mode of first data D1 from a second I/O mode (for example, MD2 of FIG. 3) to a first I/O mode (for example, MD1 of FIG. 3). In the present embodiment, the first mode changing controller 613 performs a comparison operation of comparing the write pointer WP with the read pointer RP and an I/O mode changing operation in a blank period (for example, Vblank of FIG. 6).

The second mode changing controller 623 receives a read pointer RP from the second memory controller 621. Also, the second mode changing controller 623 receives a write pointer WP from the first memory controller 611 or the first mode changing controller 613. When the zoom end command is applied, the second mode changing controller 623 compares the received write pointer WP with the received read pointer RP, and when the write pointer WP matches the read pointer RP, the second mode changing controller 623 changes the I/O mode of the first data D1 from the second I/O mode to the first I/O mode. In the present embodiment, the second mode changing controller 623 performs a comparison operation of comparing the write pointer WP with the read pointer RP and an I/O mode changing operation in a blank period (for example, Vblank of FIG. 6).

As described above, according to the present embodiment, the mode changing control logic CL1 illustrated in FIG. 15 may be provided in each of the first and second mode changing controllers 613 and 623. However, the present embodiment is not limited thereto. In other embodiments, the mode changing control logic CL1 illustrated in FIG. 15 may be provided in the first mode changing controller 613 or the second mode changing controller 623.

Figure 17:
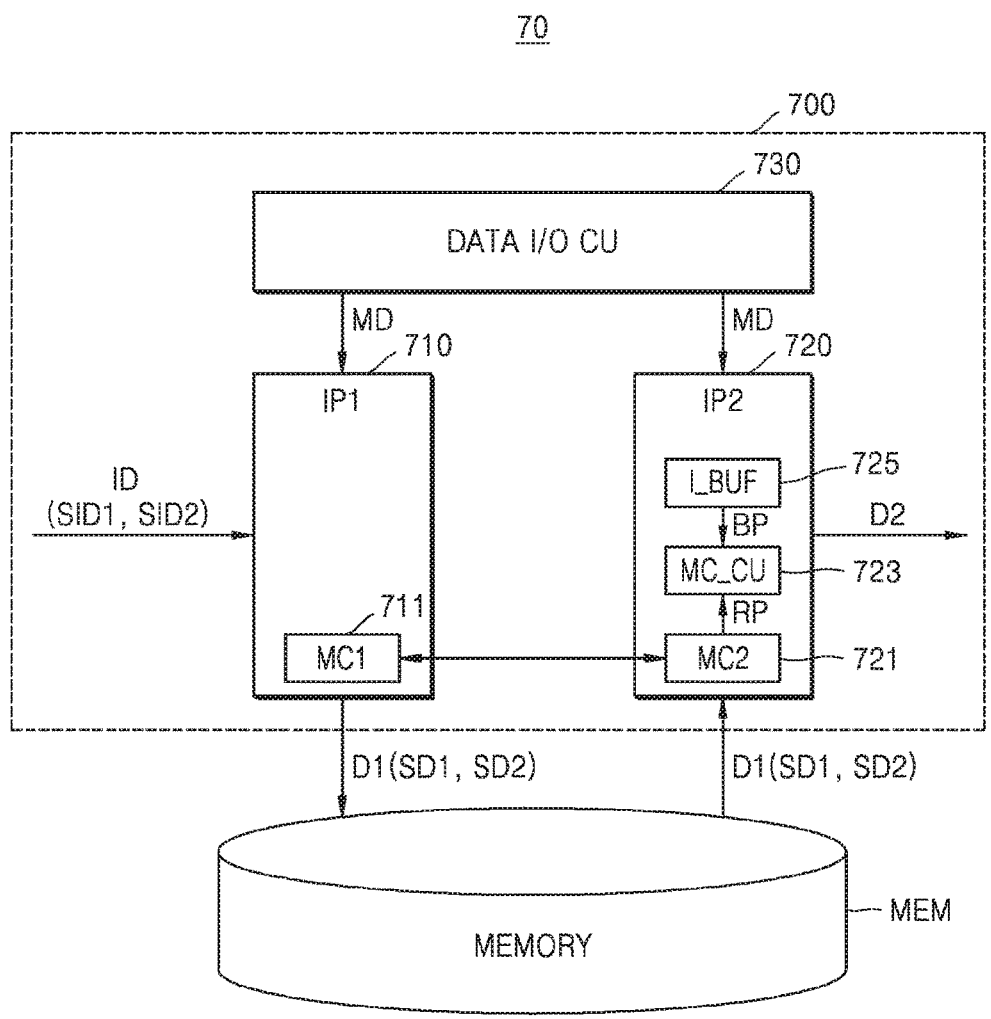
FIG. 17 is a block diagram illustrating an image processing apparatus according to an exemplary embodiment of the inventive concept.

FIG. 17 is a block diagram illustrating an image processing apparatus 70 according to an exemplary embodiment of the inventive concept.

Referring to FIG. 17, the image processing apparatus 70 includes an image signal processor 700 and a memory MEM. The image signal processor 700 includes a first image processing unit 710, a second image processing unit 720, and a data I/O control unit 730. The memory MEM may be implemented as described above with reference to FIG. 1. The image processing apparatus 70 according to the present embodiment may be implemented by modifying the image processing apparatus 40 of FIG. 11. Hereinafter, a difference between the embodiment of FIG. 17 and the embodiment of FIG. 11 will be primarily described to avoid repetition.

In the present embodiment, the first image processing unit 710 includes a first memory controller (MC1) 711, and the second image processing unit 720 includes a second memory controller (MC2) 721, a mode changing controller (MC CU) 723, and an internal buffer (I BUF) 725. The internal buffer 725 may arbitrarily store first data D1 read from the memory MEM. The first and second memory controllers 711 and 721 may be respectively implemented in a manner substantially similar to the first and second memory controllers 411 and 421 of FIG. 11.

The mode changing controller 723 receives a read pointer RP from the second memory controller 721. Here, the read pointer RP may indicate a location of the memory MEM at which a read operation has been completed by the second image processing unit 720. The read pointer RP may indicate an address of an area at which the read operation has completed in the memory MEM. Therefore, the mode changing controller 723 may check a range in which a read operation of the second image processing unit 720 is performed for the first data D1 stored in the memory MEM. In detail, the mode changing controller 723 may check the read pointer RP to determine whether the second image processing unit 720 has read all of the first data D1 corresponding to a predetermined image size (for example, a zoom zone).

Moreover, the mode changing controller 723 receives a buffer pointer BP from the internal buffer 725. Here, the buffer pointer BP may indicate a location at which a second image processing operation at the first data D1 stored in the internal buffer 725 has been completed by the second image processing unit 720. The buffer pointer BP may indicate an address of an area at which the second image processing operation has completed in the internal buffer 725. Therefore, the mode changing controller 723 may determine whether the internal buffer 725 is empty, and thus may determine whether the second image processing operation has completed for the first data D1 read from the memory MEM.

When a zoom end command is applied, the mode changing controller 723 changes an I/O mode of the first data D1 from a second I/O mode to a first I/O mode, based on the read pointer RP and the buffer pointer BP. In an embodiment, the mode changing controller 723 determines whether a read operation has completed for the first data D1, based on the read pointer RP and determines whether the second image processing operation has completed for the read first data D1, based on the buffer pointer BP. When it is determined that the read operation and the second image processing operation have been completed for the first data D1, the mode changing controller 723 changes the I/O mode of the first data D1 from the second I/O mode to the first I/O mode.

Figure 18:
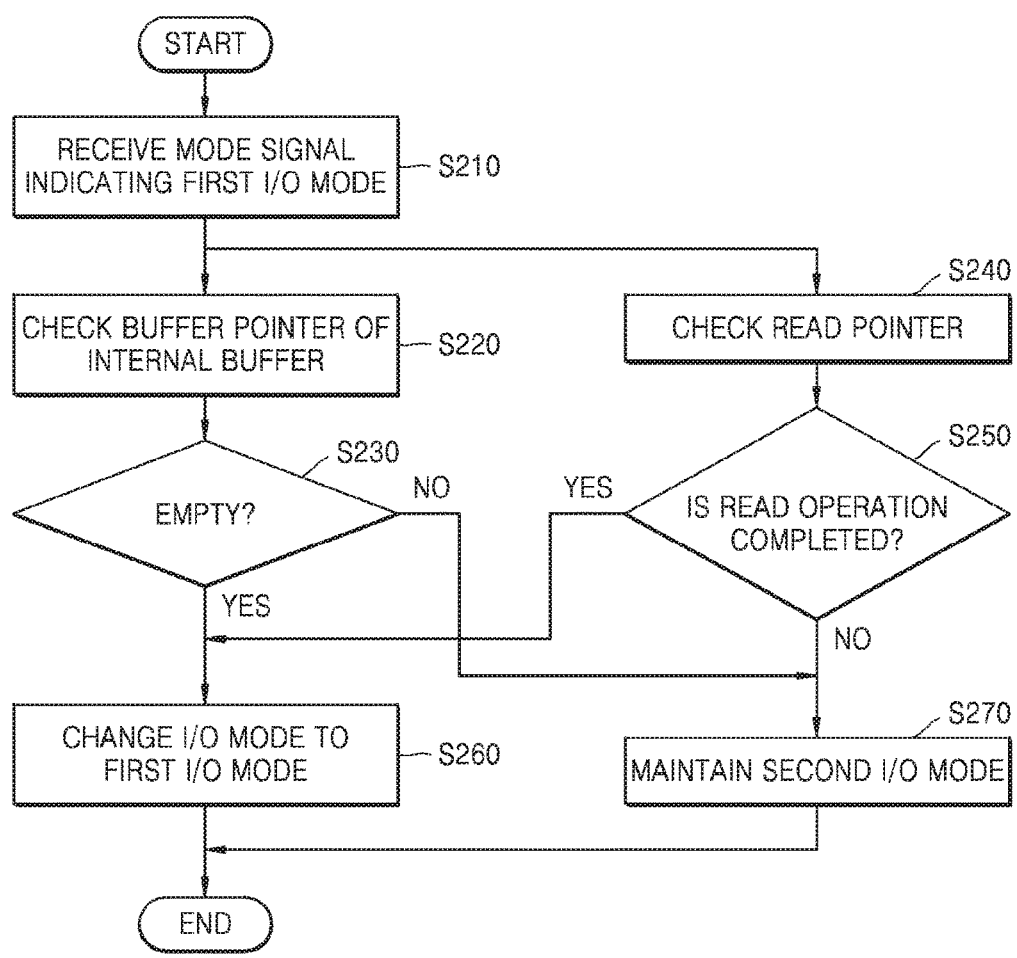
FIG. 18 is a flowchart illustrating an image processing method according to an exemplary embodiment of the inventive concept.

FIG. 18 is a flowchart illustrating an image processing method according to an exemplary embodiment of the inventive concept.

Referring to FIG. 18, the image processing method according to an embodiment may be a method which is time-serially performed by an image processing apparatus, and for example, may include operations which are time-serially performed by the image processing apparatus 70 of FIG. 17. In detail, the image processing method according to an embodiment may include operations which are time-serially performed by the mode changing controller 723 of FIG. 17. Hereinafter, an image processing method corresponding to an operation of the mode changing controller 723 will be described with reference to FIGS. 17 and 18.

In operation S210, the mode changing controller 723 receives a mode signal indicating a first I/O mode. Here, the first I/O mode may be the direct mode. For example, the data I/O control unit 730 generates a mode signal MD and supplies the generated mode signal MD to the mode changing controller 723. However, the present embodiment is not limited thereto, and the mode changing controller 723 may instead receive a zoom end command to perform operations which will be described below.

In operation S220, the mode changing controller 723 checks the buffer pointer BP of the internal buffer 725. In operation S230, the mode changing controller 723 determines whether the internal buffer 725 is empty based on the buffer pointer. When it is determined that the internal buffer 725 is empty, operation S260 is performed, and when it is determined that the internal buffer 725 is not empty, operation S270 is performed.

In operation S240, the mode changing controller 723 checks the read pointer RP. In operation S250, the mode changing controller 723 determines whether the first data D1 has been read based on the read pointer. When it is determined that the first data D1 has been read, operation S260 is performed, and when it is determined that the first data D1 has not been completely read, operation S270 is performed.

In operation S260, the mode changing controller 723 changes an I/O mode of the first data D1 from a second I/O mode to a first I/O mode. When the internal buffer 725 is empty and the first data D1 has been read, the first image processing unit 710 determines that the second image processing unit 720 has read all of the first data D1 of a corresponding frame which is written to the memory MEM by the first image processing unit 710, and also determines that the second image processing unit 720 has completed a second image processing operation on the first data D1. Therefore, the mode changing controller 723 allows the first data D1 to be transferred between the first and second image processing units 710 and 720 according to the first I/O mode.

In operation S270, the mode changing controller 723 maintains the I/O mode of the first data D1 as the second I/O mode. When the internal buffer 725 is not empty, the mode changing controller 723 determines that the second image processing unit 720 has not completed the second image processing operation on the first data D1. Therefore, the mode changing controller 723 allows the first data D1 to continue being transferred between the first and second image processing units 710 and 720 according to the second I/O mode, thereby preventing a frame drop.

FIG. 19 illustrates an example of a mode changing control logic CL2 in the image processing apparatus 70 of FIG. 17 according to an exemplary embodiment of the inventive concept.

The image processing apparatus 70 includes an arbitrary hardware block equipped with the mode changing control logic CL2 of FIG. 19. For example, the mode changing controller 723 of FIG. 18 may be the hardware block equipped with the mode changing control logic CL2. In a case where a current period is a vertical blank period and an I/O mode is set to the direct mode, when the internal buffer 725 of the second image processing unit 720 is empty and the second image processing unit 720 has read all of the first data D1 corresponding to a predetermined image zone, the mode changing control logic CL2 according to the present embodiment determines the I/O mode as the direct mode, and otherwise, the mode changing control logic CL2 determines the I/O mode as the DMA mode.

Figure 20:
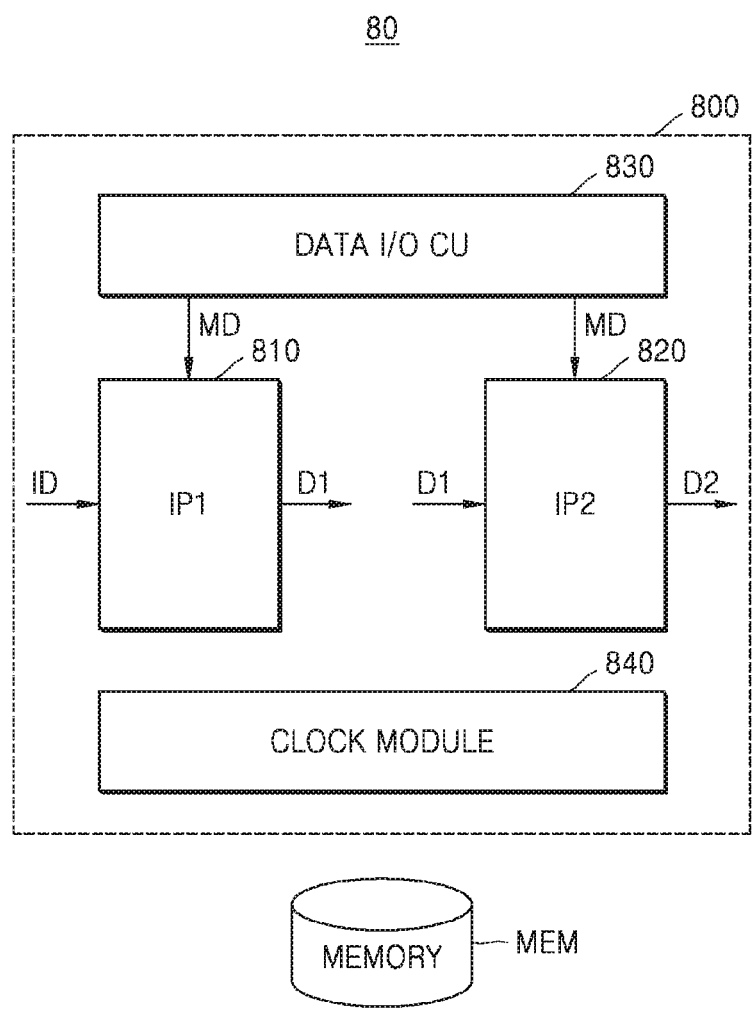
FIG. 20 is a block diagram illustrating an image processing apparatus according to an exemplary embodiment of the inventive concept.

FIG. 20 is a block diagram illustrating an image processing apparatus 80 according to an exemplary embodiment of the inventive concept.

Referring to FIG. 20, the image processing apparatus 80 includes an image signal processor 800 and a memory MEM. The image signal processor 800 includes a first image processing unit 810, a second image processing unit 820, a data I/O control unit 830, and a clock module 840. The memory MEM may be implemented as described above with reference to FIG. 1. The image processing apparatus 80 according to the present embodiment may be implemented by modifying the image processing apparatus 10 of FIG. 1. Hereinafter, a difference between the embodiment of FIG. 12 and the embodiment of FIG. 1 will be primarily described to avoid repetition.

In an embodiment, the first and second image processing units 810 and 820, the data I/O control unit 830, and the clock module 840 are each implemented as an SoC. In an embodiment, the first and second image processing units 810 and 820, the data I/O control unit 830, and the clock module 840 are located within an application processor. In an embodiment, the clock module 840 is located outside the image signal processor 800.

The clock module 840 (e.g., a clock circuit) supplies a clock signal to a plurality of IPs included in the image signal processor 800. In an embodiment, the clock module 840 increases a frequency of the clock signal supplied to the second image processing unit 820. In an embodiment, when a zoom end command is applied, the clock module 840 increases the frequency of the clock signal supplied to the second image processing unit 820.

Figure 21:
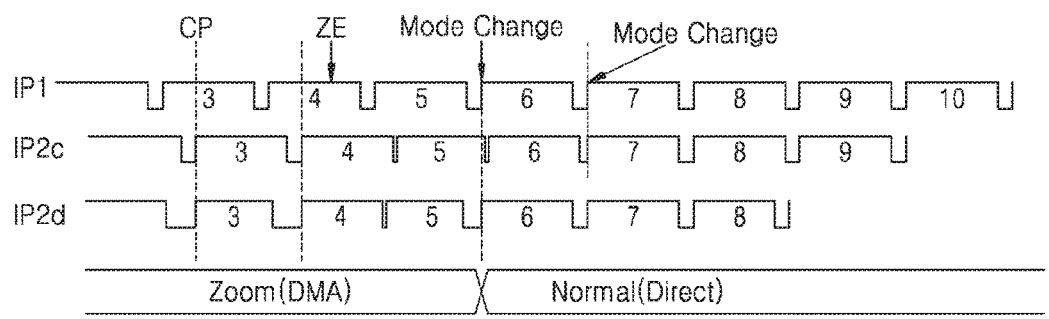
FIG. 21 is a timing diagram showing operations of first and second image processing units according to control by a clock module of FIG. 20 according to an exemplary embodiment of the inventive concept.

FIG. 21 is a timing diagram showing operations of first and second image processing units 810 and 820 according to control by the clock module 840 of FIG. 20 according to an exemplary embodiment of the inventive concept.

Referring to FIGS. 20 and 21, the image processing apparatus 80 receives a zoom end command ZE while the first image processing unit 810 is performing a first image processing operation on a fourth frame. For example, when an I/O mode of the first data D1 is changed to a first I/O mode (i.e., the direct mode) in a fifth frame and frames subsequent to the fifth frame in a state where an operation of the second image processing unit 820 has not completed in a second I/O mode (i.e., the DMA mode) corresponding to the zoom mode, the second image processing unit 820 cannot perform a second image processing operation on the first data D1 corresponding to the fourth and fifth frames for which the first image processing operation has been performed by the first image processing unit 810. For this reason, a frame drop occurs in the fourth and fifth frames.

IP2c denotes an operation of the second image processing unit 820 in a case where the clock module 840 supplies a clock signal having a first clock frequency to the second image processing unit 820 when the zoom end command ZE is applied. In this case, a blank period between fourth to sixth frames is shortened, and an operation speed of the second processing unit 820 may increase. According to an embodiment, it is checked that the second image processing unit 820 has performed the second image processing operation on the sixth frame in a blank period between the sixth frame and a seventh frame. Therefore, in the seventh frame and frames subsequent to the seventh frame, the first data D1 is transferred between the first and second image processing units 810 and 820 in the first I/O mode (i.e., the direct mode).

IP2d denotes an operation of the second image processing unit 820 in a case where the clock module 840 supplies a clock signal having a second clock frequency higher than the first clock frequency to the second image processing unit 820 when the zoom end command ZE is applied. In this case, a blank period between the fourth frame and the fifth frame is shortened, and an operation speed of the second processing unit 820 may further increase. According to an embodiment, it is checked that the second image processing unit 820 has performed the second image processing operation on the fifth frame in a blank period between the fifth frame and the sixth frame. Therefore, in the sixth frame and frames subsequent to the sixth frame, the first data D1 is transferred between the first and second image processing units 810 and 820 in the first I/O mode (i.e., the direct mode).

According to the above-described embodiment, as the clock module 840 increases a clock frequency supplied to the second image processing unit 820, a time when the I/O mode of the first data D1 is changed to the first I/O mode after the zoom end command ZE is applied may become far earlier. Therefore, in overall consideration of an operating state of the image processing apparatus 80, the clock module 840 may determine a clock frequency supplied to the second image processing unit 820 and may supply a clock signal having the determined clock frequency to the second image processing unit 820.

Figure 22:
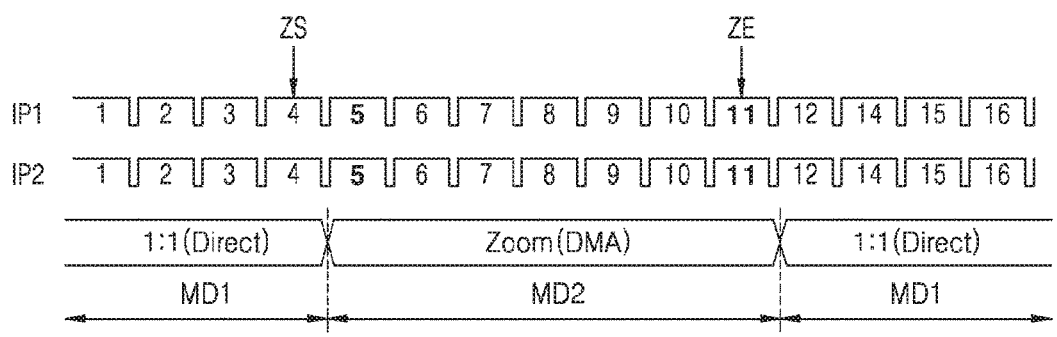
FIG. 22 is a timing diagram showing operations of first and second image processing units in an image processing apparatus according to an exemplary embodiment of the inventive concept.

FIG. 22 is a timing diagram showing operations of first and second image processing units in an image processing apparatus according to an embodiment of the inventive concept.

Referring to FIG. 22, an image processing apparatus (for example, 10 to 80) according to embodiments may include first and second image processing units IP1 and IP2, and first data generated by the first image processing unit IP1 may be transferred to the second image processing unit IP2 according to an operation mode (for example, the direct mode or the DMA mode) of the image processing apparatus.

In the normal mode, the first image processing unit IP1 directly transfers first data to the second image processing unit IP2 according to the direct mode. Therefore, latency between the first and second image processing units IP1 and IP2, and power consumption may be reduced.

In the zoom mode, the first image processing unit IP1 transfers the first data to the second image processing unit IP2 via a memory according to the DMA mode. The first image processing unit IP1 may sequentially generate first and second sub-data. The image processing apparatus may control the memory in order for the second image processing unit IP2 to read the first sub-data stored in the memory before the second sub-data is written to the memory and after the first sub-data is written to the memory. Therefore, the first data reduces latency in the DMA mode similarly to the direct mode, thereby preventing a frame from being delayed in an operation where the normal mode is changed to the zoom mode.

The image processing apparatus may include, for example, hardware equipped with the mode changing control logics of FIG. 15 or 19, and thus may prevent frame drop from occurring when the zoom mode is changed to the normal mode. Also, the image processing apparatus may increase a frequency of a clock signal supplied to the second image processing unit IP2, thereby advancing a time when an I/O mode of the first data is changed from the DMA mode to the direct mode after a zoom end command is applied.

As described above, according to the present embodiments, since a data I/O mode between IPs included in the image processing apparatus is dynamically determined based on an operation mode of the image processing apparatus, power consumption may be reduced, a capacity of used memory may be reduced, and latency may be reduced. Furthermore, a frame may be prevented from being delayed when an I/O mode is changed from the direct mode to the DMA mode, and a frame drop may be prevented from occurring when the I/O mode is changed from the DMA mode to the direct mode.

Figure 23:
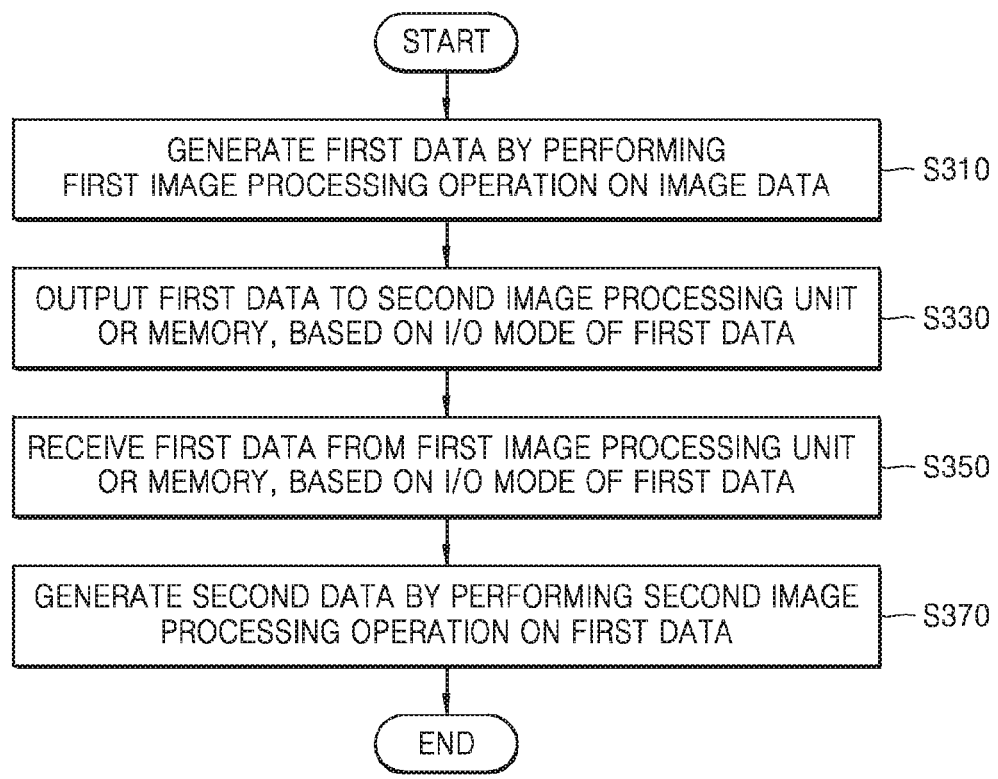
FIG. 23 is a flowchart illustrating an image processing method according to an exemplary embodiment of the inventive concept.

FIG. 23 is a flowchart illustrating an image processing method according to an exemplary embodiment of the inventive concept.

Referring to FIG. 23, the image processing method according to an embodiment may be time-serially performed by the image processing apparatus according to one of the above-described embodiments. Therefore, the details described above with reference to FIGS. 1 to 22 may be applied to the present embodiment.

In operation S310, first data is generated by performing a first image processing operation on image data. In operation S330, the first data is output to a second image processing unit or a memory, based on an I/O mode of the first data. In operation S350, the first data is received from the first image processing unit or the memory, based on the I/O mode of the first data. In operation S370, second data is generated by performing a second image processing operation on the first data.

Figure 24:
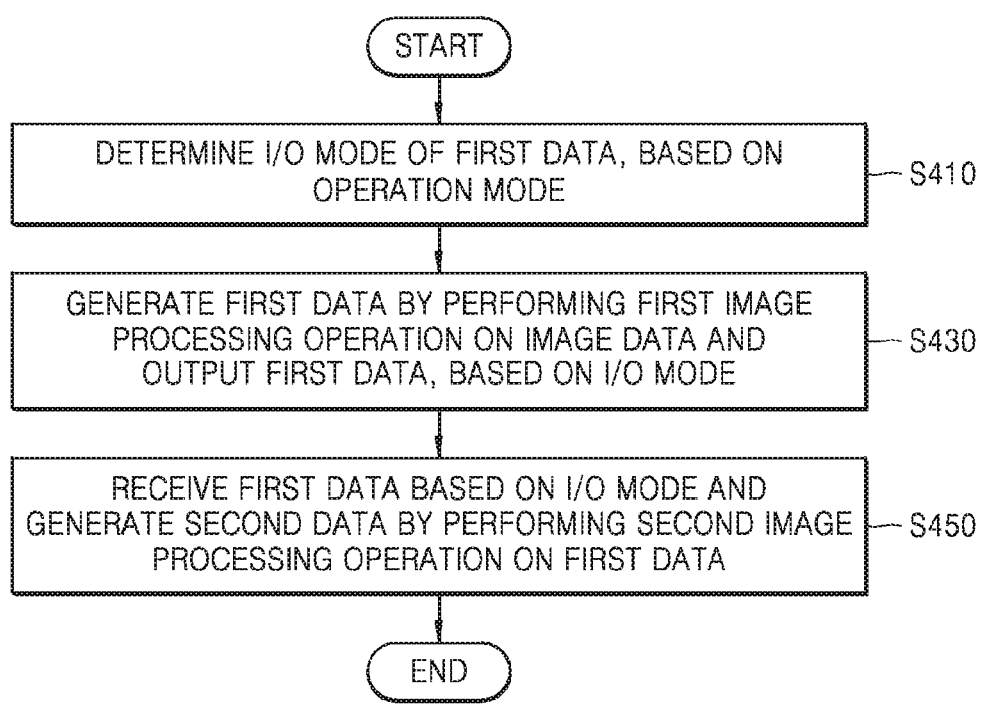
FIG. 24 is a flowchart illustrating an image processing method according to an exemplary embodiment of the inventive concept.

FIG. 24 is a flowchart illustrating an image processing method according to an exemplary embodiment of the inventive concept.

Referring to FIG. 24, the image processing method according to an embodiment may be time-serially performed by the image processing apparatus according to one of the above-described embodiments. Therefore, the details described above with reference to FIGS. 1 to 22 may be applied to the present embodiment.

In operation S410, an I/O mode of first data is determined based on an operation mode of an image processing apparatus. In operation S430, the first data is generated by performing a first image processing operation on image data and the first data is output based on the I/O mode. In operation S450, the first data is received based on the I/O mode, and second data is generated by performing a second image processing operation on the first data.

Figure 25:
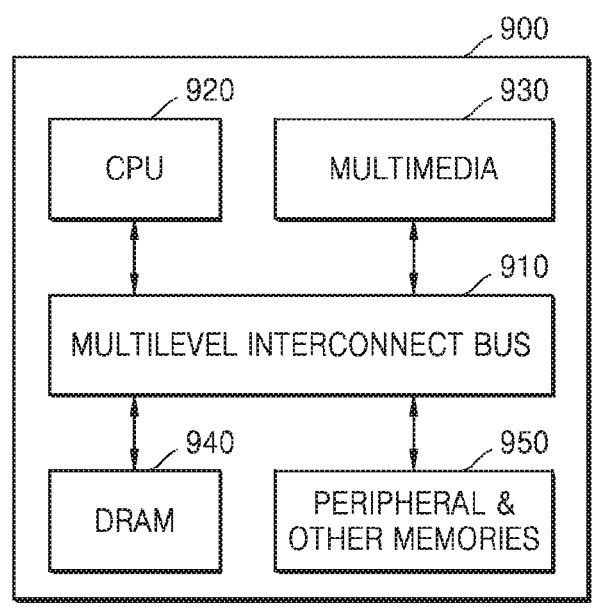
FIG. 25 is a block diagram illustrating an application processor according to an exemplary embodiment of the inventive concept.

FIG. 25 is a block diagram illustrating an application processor 900 according to an exemplary embodiment of the inventive concept.

Referring to FIG. 25, the application processor 900 includes a multilevel interconnect bus 910, a central processing unit (CPU) 920 connected to the multilevel interconnect bus 910, a multimedia unit 930, a memory device (DRAM) 940, and a peripheral circuit 950. The application processor 900 may be implemented by various types of processors, and for example, may be implemented as an SoC.

The multilevel interconnect bus 910 may be implemented with a bus to which a protocol based on a bus standard is applied. For example, the bus standard may use advanced microcontroller bus architecture (AMBA) protocol of ARM. A bus type of the AMBA protocol may include advanced high-performance bus (AHB), advanced peripheral bus (APB), advanced extensible interface (AXI), AX14, or AXI coherency extensions (ACE). AXI among the above-described bus types is an interface protocol between IPs and provides a multiple outstanding address function and a data interleaving function. In addition, other types of protocols such as nNetwork of SONICs Inc., CoreConnect of IBM, and/or open core protocol of OCP-IP may be applied to the multilevel interconnect bus 910.

Each of the IPs illustrated in FIG. 25 may be implemented as a function block that performs a unique operation. For example, the CPU 920 may correspond to a master IP and may control an overall operation of the application processor 900. Also, the multimedia unit 930 may include an image signal processor (for example, 100, 200, 300, 400, 500, 600, 700, or 800) according to one of the above-described embodiments. Also, the multimedia unit 930 may perform an image processing method according to one of the above-described embodiments. The memory device 940 may be a memory for temporarily storing various pieces of information about an operation of the application processor 900, and for example, may include a DRAM. Also, the peripheral circuit 950 may include various interfaces for interfacing with an external source and may also include various peripheral devices for realizing other functions of the application processor 900. For example, the peripheral circuit 950 may include another memory in addition to a DRAM, or may include an element for accessing an external storage device.

Figure 26:
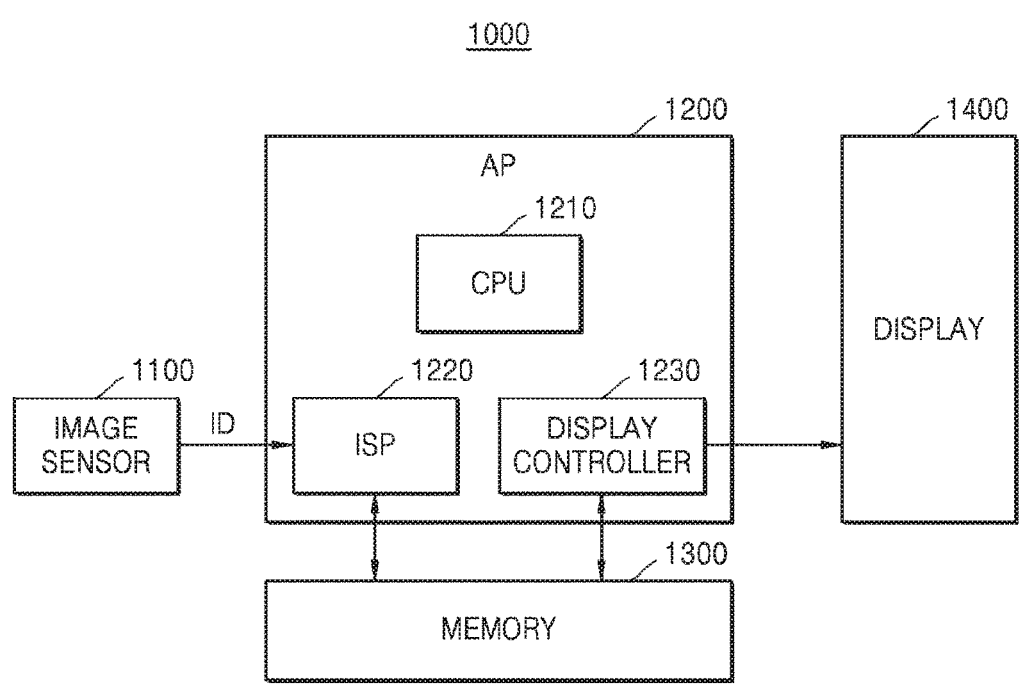
FIG. 26 is a block diagram illustrating an electronic device according to an exemplary embodiment of the inventive concept.

FIG. 26 is a block diagram illustrating an electronic device 1000 according to an exemplary embodiment of the inventive concept.

Referring to FIG. 26, the electronic device 1000 includes an image sensor 1100, an application processor 1200, a memory 1300, and a display 1400. The image sensor 1100 may be implemented with an independent semiconductor chip and may also be implemented with one semiconductor chip in combination with the application processor 1200. The image sensor 1100 may be a semiconductor device that converts an optical image into an electrical signal, and for example, may be a CMOS image sensor.

The application processor 1200 includes a CPU 1210, an image signal processor (ISP) 1220, and a display controller 1230. The ISP 1220 may be one of the above-described image signal processors 100, 200, 300, 400, 500, 600, 700, and 800. The application processor 1200 may be included in the image signal processor (for example, 100, 200, 300, 400, 500, 600, 700, or 800) according to one of the above-described embodiments.

The display 1400 may display an image according to control by the display controller 1230. The display 1400 may be implemented with a liquid crystal display (LCD), a thin film transistor-liquid crystal display (TFT-LCD), a light-emitting diode (LED) display, an organic light-emitting diode (OLED) display, an active-matrix OLED (AMOLED) display, or the like.

Figure 27:
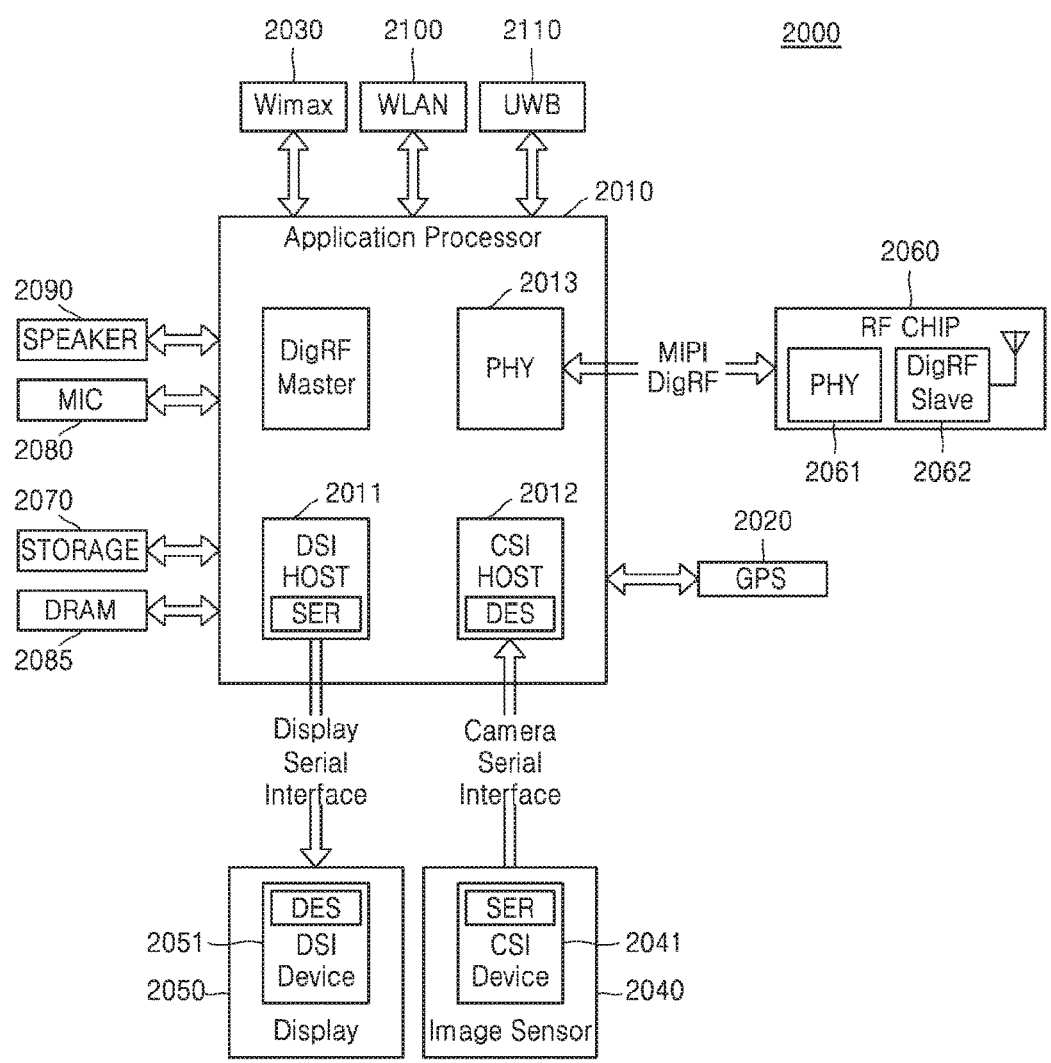
FIG. 27 is a block diagram illustrating an electronic system and an interface according to an exemplary embodiment of the inventive concept.

FIG. 27 is a block diagram illustrating an electronic system 2000 and an interface according to an exemplary embodiment of the inventive concept.

Referring to FIG. 27, the electronic system 2000 may be implemented with a data processing device (for example, a mobile phone, a personal digital assistant (PDA), a portable multimedia player (PMP), or a smartphone) capable of using or supporting a mobile industry processor interface (MIPI). The electronic system 2000 includes an application processor 2010, an image sensor 2040, and a display 2050. The application processor 2010 may be implemented according to the embodiments described above with reference to FIGS. 1 to 26.

A camera serial interface (CSI) host 2012 of the application processor 2010 may perform serial communication with a CSI device 2041 of the image sensor 2040 through a CSI. In this case, the CSI host 2012 may include a deserializer, and the CSI device 2041 may include an optical serializer. The optical serializer may include a plurality of optical modulators. For example, each optical modulator may be configured to receive a bit of image data and output an optical pulse representing a value of the corresponding bit.

A display serial interface (DSI) host 2011 of the application processor 2010 may perform serial communication with a DSI device 2051 of the display 2050 through a DSI. In this case, the DSI host 2011 may include an optical serializer, and the DSI device 2051 may include an optical deserializer.

The electronic system 2000 may further include a radio frequency (RF) chip 2060 for performing communication with the application processor 2010. A physical (PHY) 2013 of the electronic system 2000 and a PHY 2061 of the RF chip 2060 may transmit or receive data therebetween according to MIPI DigRF. The electronic system 2000 may further include a global positioning system (GPS) 2020, a storage device 2070, a microphone 2080, a dynamic random access memory (DRAM) 2085, and a speaker 2090. Also, the electronic system 2000 may perform communication by using a worldwide interoperability for microwave access (WIMAX) 2030, a wireless local area network (WLAN) 2100, and an ultra-wide band (UWB) 2110.

The application processor or the image processing apparatus according to the above-described embodiments may be implemented with various types of packages. For example, at least some elements of the application processor or the image processing apparatus may be mounted by using packages such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), system in package (SIP), multi-chip package (MCP), wafer-level fabricated package (WFP), and/or wafer-level processed stack package (WSP).

While the inventive concept has been particularly shown and described with reference to embodiments thereof, it will be understood that various changes in form and details may be made therein without departing from the embodiments of the inventive concept.

What is claimed is:

1. An image processing apparatus comprising:
   a memory;
   a data input/output (I/O) controller;
   a first image processor configured to perform a first Image processing operation on image data to generate first data; and
   a second image processor configured to perform a second image processing operation on the first data to generate second data,
   wherein the image processing apparatus directly transfers the first data from the first image processor to the second image processor through a signal line directly connecting the first processor and the second processor without accessing the memory, when an operation mode is set to a first operation mode, wherein the first operation mode is a normal mode,
   wherein the image processing apparatus indirectly transfers the first data from the first image processor to the second image processor via the memory, when the operation mode is set to a second operation mode, wherein the second operation mode is a zoom mode,
   wherein the data (I/O) controller is configured to determine the operation mode, generate a signal indicating the determined operation mode, and output the signal to the first Image processor, and
   wherein the first image processor outputs the first data to the second image processor when the outputted signal indicates the first operation mode and outputs the first data to the memory when the outputted signal indicates the second operation mode.

2. The Image processing apparatus of claim 1, wherein the data I/O controller is further configured to determine an input/output (I/O) mode of the first data as one of a first input/output (I/O) mode where the first data is directly transferred from the first image processor to the second image processor and a second input/output (I/O) mode where the first data is transferred from the first image processor to the second image processor via the memory, based on the operation mode.

3. The image processing apparatus of claim 2, wherein the data controller is located outside the first and second image processors.

4. The image processing apparatus of claim 2, wherein the data I/O controller is located within at least one of the first and second image processors.

5. The image processing apparatus of claim 4, wherein the data I/O controller comprises:
   a data output controller located within the first image processor, the data output controller for controlling an output of the first data to output the first data to the second image processor in the first I/O mode and output the first data to the memory in the second I/O mode; and
   a data input controller located within the second image processor, the data input controller for controlling an input of the first data to receive the first data from the first image processor in the first I/O mode and receive the first data from the memory in the second I/O mode.

6. The image processing apparatus of claim 2, wherein the image data comprises first sub-image data and second sub-image data, wherein the first image processor sequentially performs the first image processing operation on the first sub-image data and the second sub-image data to sequentially generate first sub-data and second sub-data, and wherein the image processing apparatus further comprises a memory controller configured to control the memory to enable the second image processor to read the first sub-data from the memory before the second sub-data is written in the memory after the first sub-data is written in the memory.

7. The image processing apparatus of claim 6, wherein the memory controller is located outside the first and second image processors and supplies a read command for reading the first sub-data from the memory before supplying a write command for writing the first sub-data in the memory.

8. The image processing apparatus of claim 6, wherein the memory controller is located within at least one of the first and second image processors.

9. The image processing apparatus of claim 8, wherein the memory controller comprises:
   a first memory controller disposed in the first image processor, the first memory controller configured to record a time when the first sub-data is written in the memory; and
   a second memory controller disposed in the second image processor, the second memory controller configured to sense the time when the first sub-data is written to the memory.

10. The image processing apparatus of claim 6, further comprising: a mode changing controller configured to compare a write pointer and a read pointer received from the memory controller when a zoom end command is applied, and change the I/O mode of the first data from the second I/O mode to the first I/O mode when the write pointer matches the read pointer.

11. The image processing apparatus of claim 10, wherein the mode changing controller is located within the data I/O controller.

12. The image processing apparatus of claim 10, wherein the mode changing controller is located in at least one of the first and second image processors.

13. The image processing apparatus of claim 12, wherein the mode changing controller comprises:
   a first mode changing controller located in the first image processor to receive the write pointer; and
   a second mode changing controller located in the second image processor to receive the read pointer.

14. The image processing apparatus of claim 6, wherein the second image processor comprises:
   an internal buffer; and
   a mode changing controller configured to, when a zoom end command is applied, change the I/O mode of the first data from the second I/O mode to the first I/O mode, based on a read pointer received from the memory controller and a buffer pointer of the internal buffer.

15. The image processing apparatus of claim 6, further comprising:
   a clock circuit configured to increase a frequency of a clock signal supplied to the second image processor when a zoom end command is applied.

16. An application processor comprising:
   a data input/output (I/O) controller;

a first image processor configured to perform a first image processing operation on image data to generate first data; and a second image processor configured to perform a second image processing operation on the first data to generate second data, wherein the application processor directly transfers the first data from the first image processor to the second image processor through a signal line directly connecting the first processor and the second processor without accessing a memory when an operation mode is set to a first operation mode, wherein the first operation mode is a normal mode, wherein the application processor transfers the first data from the first image processor to the second image processor via the memory when the operation mode is set to a second operation mode, wherein the second operation mode is a zoom mode, wherein the data (I/O) controller is configured to determine the operation mode, generate a signal indicating the determined operation mode, and output the signal to the first Image processor, and wherein the first image processor outputs the first data to the second image processor when the outputted signal indicates the first operation mode and outputs the first data to the memory when the outputted signal indicates the second operation mode.

17. An image processing apparatus comprising:
a memory controller;
a data input/output (I/O) controller;
a first image processor configured to perform a first image processing operation on image data to generate first data; and a second image processor configured to perform a second image processing operation on the first data to generate second data, wherein the image processing apparatus directly transfers the first data from the first image processor to the second image processor through a signal line directly connecting the first processor and the second processor without accessing the memory controller when an operation mode is set to a first operation mode, wherein the first operation mode is a normal mode, wherein the image processing apparatus transfers the first data from the first image processor to the second image processor via the memory controller when the operation mode is set to a second operation mode, wherein the second operation mode is a zoom mode, wherein the data (I/O) controller is configured to determine the operation mode, generate a signal indicating the determined operation mode, and output the signal to the first Image processor, and wherein the first image processor outputs the first data to the second image processor when the outputted signal indicates the first operation mode and outputs the first data to the memory controller when the outputted signal indicates the second operation mode.

18. The image processing apparatus of claim 17, wherein the first image processing operation excludes a scaling operation and the second image processing operation performs the scaling operation.

19. The image processing apparatus of claim 17, wherein the first image processing operation excludes a demosaicing operation and the second image processing operation performs the demosaicing operation.

* * * * *